(12) United States Patent
Liu et al.

(10) Patent No.: US 11,240,063 B2
(45) Date of Patent: Feb. 1, 2022

(54) METHODS, NODES AND COMPUTER READABLE MEDIA FOR TUNNEL ESTABLISHMENT PER SLICE

(71) Applicant: Telefonaktiebolaget LM Ericsson (publ), Stockholm (SE)

(72) Inventors: Yanxing Liu, Beijing (CN); Xianmin Li, Beijing (CN); Xin Dong, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/646,344

(22) PCT Filed: Sep. 7, 2018

(86) PCT No.: PCT/CN2018/104587
§ 371 (c)(1),
(2) Date: Mar. 11, 2020

(87) PCT Pub. No.: WO2019/052406
PCT Pub. Date: Mar. 21, 2019

(65) Prior Publication Data
US 2020/0274739 A1    Aug. 27, 2020

(30) Foreign Application Priority Data

Sep. 13, 2017   (WO) ................ PCT/CN2017/101660

(51) Int. Cl.
*H04L 12/46*   (2006.01)
*H04L 12/24*   (2006.01)
*H04L 12/26*   (2006.01)

(52) U.S. Cl.
CPC ...... *H04L 12/4633* (2013.01); *H04L 12/4641* (2013.01); *H04L 41/0896* (2013.01);
(Continued)

(58) Field of Classification Search
CPC ............. H04L 12/4633; H04L 12/4641; H04L 41/0896; H04L 41/12; H04L 41/5045; H04L 43/0894
See application file for complete search history.

(56) References Cited

U.S. PATENT DOCUMENTS 7,590,074 B1 *  9/2009  Dondeti .............. H04L 12/4675
                                                    370/254
10,278,108 B2 *  4/2019  Shaw .................... H04W 36/32
(Continued)

FOREIGN PATENT DOCUMENTS

EP         2 978 176 A1      1/2016

OTHER PUBLICATIONS

PCT Notification of Transmittal of the International Search Report and the Written Opinion of the International Searching Authority, or the Declaration for International application No. PCT/CN2018/104587—dated Nov. 30, 2018.
(Continued)

*Primary Examiner* — Blake J Rubin
(74) *Attorney, Agent, or Firm* — Baker Botts L.L.P.

(57) ABSTRACT

A method in a controlled node and a corresponding controlled node. The method comprises: receiving, from a control node, a computed result of logical topology for each slice on a physical topology composed by controlled nodes under control of the control node, and splitting information and constraints for each slice (S301); splitting a physical port into the at least one logical port for a slice based on the received splitting information (S303); associating the at least one logical port for the slice with a slice container (S305); applying the constraints for the slice on the at least one logical port (S307); generating a routing table for the slice based on the received computed result and the constraints (S309); and computing at least one tunnel according to the
(Continued)

routing table for the slice based on the slice requirements of the slice (S311).

28 Claims, 14 Drawing Sheets

(52) U.S. Cl.
CPC .......... *H04L 41/12* (2013.01); *H04L 41/5045* (2013.01); *H04L 43/0894* (2013.01)

(56) References Cited

U.S. PATENT DOCUMENTS

| | | | |
|---|---|---|---|
| 10,405,193 B1* | 9/2019 | Cui | H04W 16/10 |
| 2003/0120822 A1 | 6/2003 | Langrind et al. | |
| 2004/0066782 A1* | 4/2004 | Nassar | H04L 47/70 |
| | | | 370/389 |
| 2010/0177674 A1* | 7/2010 | Aggarwal | H04L 45/50 |
| | | | 370/312 |
| 2013/0259465 A1* | 10/2013 | Blair | H04Q 11/0067 |
| | | | 398/2 |
| 2013/0297769 A1 | 11/2013 | Chang et al. | |
| 2013/0311623 A1* | 11/2013 | Kanada | H04L 41/0806 |
| | | | 709/221 |
| 2015/0003458 A1 | 1/2015 | Li et al. | |
| 2015/0043382 A1 | 2/2015 | Arora et al. | |
| 2016/0353465 A1* | 12/2016 | Vrzic | H04W 28/0247 |
| 2016/0359721 A1* | 12/2016 | Hu | H04L 45/02 |
| 2017/0005922 A1* | 1/2017 | Tantsura | H04L 45/72 |
| 2017/0054628 A1* | 2/2017 | Tomotaki | H04L 12/4633 |
| 2017/0078216 A1 | 3/2017 | Adolph et al. | |
| 2017/0086049 A1* | 3/2017 | Vrzic | H04W 40/00 |
| 2017/0244593 A1 | 8/2017 | Rangasamy et al. | |
| 2018/0041905 A1* | 2/2018 | Ashrafi | H04W 48/18 |
| 2018/0302877 A1* | 10/2018 | Bosch | H04W 76/10 |
| 2018/0309641 A1* | 10/2018 | Wang | H04L 41/08 |
| 2018/0367412 A1* | 12/2018 | Sethi | H04L 41/0853 |
| 2019/0052580 A1* | 2/2019 | Peng | H04L 47/825 |
| 2019/0110207 A1* | 4/2019 | Makhijani | H04W 8/08 |
| 2019/0223023 A1* | 7/2019 | Altay | H04W 4/50 |
| 2019/0259092 A1* | 8/2019 | Oktay | H04W 28/20 |
| 2019/0260641 A1* | 8/2019 | Giust | H04L 41/0893 |
| 2019/0289647 A1* | 9/2019 | Li | H04L 67/1097 |
| 2020/0044930 A1* | 2/2020 | Stafford | H04L 41/0896 |
| 2020/0112543 A1* | 4/2020 | Weed | H04L 69/08 |

OTHER PUBLICATIONS

EPO Extended European Search Report issued for Application No./Patent No. 18856801.8-1216 / 3682621 PCT/CN2018104587— dated May 3, 2021.
Segment Routing Architecture; Network Working Group; Internet— Draft; Intended status: Standards Track by C. Filsfils, Ed. et al.—May 28, 2015.

* cited by examiner

METHODS, NODES AND COMPUTER READABLE MEDIA FOR TUNNEL ESTABLISHMENT PER SLICE

PRIORITY

This nonprovisional application is a U.S. National Stage Filing under 35 U.S.C § 371 of International Patent Application Ser. No. PCT/CN2018/104587 filed Sep. 7, 2018 and entitled "METHODs, NODES AND COMPUTER READABLE MEDIA FOR TUNNEL ESTABLISHMENT PER SLICE" which claims priority to International Application No. PCT/CN2017/101660 filed Sep. 13, 2017 both of which are hereby incorporated by reference in their entirety.

TECHNICAL FIELD

The present disclosure generally relates to the technical field of telecommunication, and particularly to a method at a control node, a method at a controlled node, a control node, a controlled node and computer readable media for tunnel establishment per slice.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Network slicing is one of key capabilities that will enable flexibility, as it allows multiple logical networks to be created on top of a common shared physical infrastructure. Greater elasticity brought by the network slicing will help to address cost, efficiency, and flexibility requirements imposed by the future.

In ITU (International Telecommunications Union) and 3GPP (the 3rd Generation Partnership Project), there is a preliminary network slicing agreement regarding three main use cases that the network slicing technology must support. As illustrated in FIG. 1, they are: eMBB (enhanced mobile broadband), URLLC (ultra-reliable low latency communications) and mMTC (massive machine type communications). eMBB refers to extended support of conventional MBB through improved peak/average/cell-edge data rates, capacity and coverage. URLLC is a requirement for emerging critical applications such as industrial internet, smart grids, infrastructure protection, remote surgery and ITSs (Intelligent Transportation Systems). Last but certainly not least, mMTC is necessary to support envisioned 5G IoT (Internet-of-Things) scenarios with tens of billions of connected devices and sensors.

The network slicing concept enables network elements and functions to be easily configured and reused in each network slice (also referred to as "slice" for simplicity herein) to meet a specific requirement. Implementation of the network slicing is conceived to be an end-to-end feature that includes a core network, a RAN (random access network) and a transport network. Each slice can have its own network architecture, engineering mechanism and network provisioning.

A container is an instance of a virtual router, and has its own management domain, Authentication, Authorization, and Accounting (AAA) name space, IP address space, and routing protocols. Containers may be created and deleted with configuration commands. Containers share common resources, such as memory and processor cycles, but each slice container functions independently of all other slice containers configured on the router.

A slice container may be configured as one-to-one mapping with an IGP (Interior Gateway Protocol) instance or may be configured as a number of IGP instances included in one container.

The existing cellular network architecture is relatively monolithic, with a transport network that facilitates mobile traffic to end devices. They are not flexible enough to support a wider range of performance and scalability requirements. The network slicing would allow the 5G network to be sliced logically into multiple virtual networks. Each slice can be optimized to serve a specific vertical application to efficiently support network services, thus providing a high degree of flexibility in enabling several used network slices to be active concurrently. This is already a well understood methodology towards 5G industry, such as SDN (software-defined network).

Generally in a SDN-based solution, segment routing is popular technology for the end-to-end path setup in the transport network, which establishes the traffic traverse path based on IGP and leverages the existing MPLS (Multiple Protocol Label Switching) data plane. The segment routing is a method of forwarding packets on the network based on a source routing paradigm. The forward path is determined before the packet is even sent. The path is encoded in the packet, at the source as a list of segments bearing forwarding instructions. At each hop, a top segment, which references RIB (Router Information Base), is used to identify the next hop. Segments are stacked in order, at the top of the packet header. When the top segment contains an identity of another node, the receiving node uses ECMP (Equal-Cost Multi-Path) to move the packet to the next hop. When the identity is that of the receiving node, the node pops the top segment and performs the task required by the next segment. Segment routing leverages other IGPs such as IS-IS (Intermediate System-Intermediate System), OSPF (Open Shortest Path First), and MPLS (Multiple Protocol Label Switching) for efficient and flexible forwarding. Segment routing is a faster and a more efficient way of forwarding traffic in the MPLS core network.

Each router (node) has an associated SID (segment identifier), which is referred to as a node SID. Each link (adjacency) has an associated SID, which is referred to as an adjacency SID. The node SID is globally unique and represents the shortest path to a router as determined by the IGP. A network administrator allocates a node SID to each router from a reserved block. On the other hand, the adjacency SID is locally significant and represents a specific adjacency, such as an egress interface, to a neighboring router. Routers automatically generate the adjacency SIDs outside of the reserved blocks of the node SIDs.

In an MPLS network, a SID is encoded as an MPLS label stack entry. The SID directs data along a specified path. There are two kinds of SIDs:

Prefix SID—A SID that contains an IP address prefix calculated by the IGP in a service provider core network. The prefix SID is globally unique. A node SID is a special form of the prefix SID that contains a loop-back address of the node as the prefix. It is advertised as an index into a node-specific SRGB (Segment Routing Global Block).

Adjacency SID—A SID that contains an advertising router's adjacency to a neighbor. The adjacency SID is a link between two routers. Since the adjacency SID is relative to a specific router, it is locally unique.

When a slice traverses in a L2/L3 VPN and goes through an end-to-end LSP (Label Switching Path) from one PE (Provider Edge) to another PE, transport service assurance, e.g. QoS (Quality of Service), applies on the end-to-end LSP.

The end-to-end LSP may be allocated by LDP (Label Distribution Protocol) or RSVP/RSVP-TE (Resource Reservation Protocol-Traffic Engineering) in a traditional network deployment solution. In the SDN-based solution, the segment routing is used for the end-to-end path setup in the transport network.

Regardless of the traditional network deployment solution or the SDN-based solution, the end-to-end path may be shared by several slices. As a consequence, there is a problem with either the traditional network deployment solution or the SDN-based solution that the service assurance cannot be applied to a slice, since the slice is invisible when it passes through the transport network.

Furthermore, there is no solution or standardization yet on how to map VPN routes (prefixes) with the slices.

SUMMARY

Accordingly, at least some objects of the present disclosure are provide technical solutions of how to establish at least one end-to-end path (i.e., at least one tunnel) for each slice, i.e., represent the slice in the transport network, so that the service assurance, e.g. QoS, can be conformed on the specific slice based on the representation of the specific slice in the transport network; how to establish mapping between the VPNs and the slices; and how to extend BGP (Border Gateway Protocol) to carry mapping between the prefixes and the slices.

According to one aspect of the present disclosure, a method in a control node is provided, comprising:

parsing a slice profile which defines slice requirements of at least one slice; computing, according to the slice profile, a result of logical topology for each slice on a physical topology composed by controlled nodes under control of the control node;

generating splitting information for indicating a controlled node to split a physical port into at least one logical port for each slice and constraints of the at least one logical port for each slice, based on the computed result; and transmitting the computed result, the splitting information and the constraints for each slice to the controlled node.

In an embodiment, one slice contains the at least one logical port in a controlled node.

In an embodiment, the physical port that carries slice information is indicated to be split into the at least one logical port.

In an embodiment, the slice profile contains at least one of:
a number of the at least one slice;
bandwidth for each of the at least one slice;
latency for each of the at least one slice.

In an embodiment, the constraints for the slice refer to bandwidth and/or latency for the slice.

In an embodiment, the slice profile further contains a prefix list and/or a media access control 'MAC' list, wherein the prefix list and/or the MAC list can be empty.

In an embodiment, the slice profile is predetermined or received from an external source.

According to another aspect of the present disclosure, a control node is provided, comprising:

a communication interface arranged for communication with a controlled node, at least one processor, and a memory including instructions which, when executed by the at least one processor, cause the control node to:

parse a slice profile which defines slice requirements of at least one slice;

compute, according to the slice profile, a result of logical topology for each slice on a physical topology composed by controlled nodes;

generate splitting information for indicating a controlled node to split a physical port into at least one logical port for each slice and constraints of the at least one logical port for each slice, based on the computed result; and transmit, via the communication interface, the computed result, the splitting information and the constraints for each slice to the controlled node.

In an embodiment, one slice contains the at least one logical port in a controlled node.

In an embodiment, the physical port that carries slice information is indicated to be split into the at least one logical port.

In an embodiment, the slice profile contains at least one of:
a number of the at least one slice;
bandwidth for each of the at least one slice;
latency for each of the at least one slice.

In an embodiment, the constraints refer to bandwidth and/or latency for each of the at least one slice.

In an embodiment, the slice profile further contains a prefix list and/or a media access control 'MAC' list, wherein the prefix list and/or the MAC list can be empty.

In an embodiment, the slice profile is predetermined or received from an external source.

According to another aspect of the present disclosure, a control node is provided, comprising:

a parsing unit, configured to parse a slice profile which defines slice requirements of at least one slice;

a computation unit, configured to compute, according to the slice profile, a result of logical topology for each slice on a physical topology composed by controlled nodes;

a generation unit, configured to generate splitting information for indicating a controlled node to split a physical port into at least one logical port for each slice and constraints of the at least one logical port for each slice, based on the computed result; and a transceiver, configured to transmit the computed result, the splitting information and the constraints for each slice to the controlled node.

In an embodiment, the slice contains the at least one logical port in a controlled node.

In an embodiment, the physical port that carries slice information is indicated to be split into the at least one logical port.

In an embodiment, the slice profile contains at least one of:
a number of the at least one slice;
bandwidth for each of the at least one slice;
latency for each of the at least one slice.

In an embodiment, the constraints refer to bandwidth and/or latency for each of the at least one slice.

In an embodiment, the slice profile further contains a prefix list and/or a media access control 'MAC' list, wherein the prefix list and/or the MAC list can be empty.

In an embodiment, the slice profile is predetermined or received from an external source.

According to another aspect of the present disclosure, a method in a controlled node is provided, comprising:

receiving, from a control node, a computed result of logical topology for each slice on a physical topology composed by controlled nodes under control of the control node, and splitting information and constraints for each slice, wherein the computed result is computed according to a slice profile which defines slice requirements of at least one slice, the splitting information and the constraints for each slice are respectively generated based on the computed result, and the splitting information indicates the controlled node to split a physical port into at least one logical port for each slice;

splitting a physical port into at least one logical port for a slice based on the received splitting information;

associating the at least one logical port for the slice with a slice container;

applying the constraints for the slice on the at least one logical port;

generating a routing table for the slice based on the received computing result and the constraints; and computing at least one tunnel according to the routing table for the slice based on the slice requirements of the slice.

In an embodiment, the slice container at least comprises information on the at least one logical port and the at least one slice.

In an embodiment, one slice contains the at least one logical port in the controlled node.

In an embodiment, the physical port being split into the at least one logical port carries slice information.

In an embodiment, the slice profile contains at least one of:

a number of the at least one slice;

bandwidth for each of the at least one slice;

latency for each of the at least one slice.

In an embodiment, the constraints for the slice refer to bandwidth and/or latency for the slice.

In an embodiment, the slice profile further contains a prefix list and/or a media access control 'MAC' list, wherein the prefix list and/or the MAC list can be empty.

In an embodiment, the controlled node is configured as an intermediate node.

In an embodiment, the controlled node is configured as an edge node, and the method further comprises:

resolving, in the at least one tunnel in one slice container, routes of at least one slice traffic included in at least one virtual private network 'VPN'.

In an embodiment, the slice container is configured as one-to-one mapping with an Interior Gateway Protocol 'IGP' instance, and the step of resolving, in the at least one tunnel in one slice container, the routes of the at least one slice traffic included in at least one VPN further comprises:

configuring a boarder gateway protocol 'BGP' route policy to filter the prefix list and/or the MAC list, in order to map between the at least one VPN and the at least one slice; and ignoring the 'BGP' route policy when the prefix list and/or the MAC list are empty.

In an embodiment, the slice container is configured as a plurality of Interior Gateway Protocol 'IGP' containers included in one slice instance, and the step of resolving, in the at least one tunnel in one slice container, the routes of the at least one slice traffic included in at least one VPN further comprises:

configuring a boarder gateway protocol 'BGP' message with an extension field which indicates mapping between prefixes and the at least one slice based on the slice profile and is included in a last field of the BGP message, in order to map between the at least one VPN and the at least one slice.

According to another aspect of the present disclosure, a controlled node is provided, comprising:

a communication interface arranged for communication, at least one processor, and a memory including instructions which, when executed by the at least one processor, cause the control node to:

receive, from a control node, a computed result of logical topology for each slice on a physical topology composed by controlled nodes under control of the control node, and splitting information and constraints for each slice, wherein the computed result is computed according to a slice profile which defines slice requirements of at least one slice, the splitting information and the constraints for each slice are respectively generated based on the computed result, and the splitting information indicates the controlled node to split a physical port into at least one logical port for each slice;

split a physical port into the at least one logical port for a slice based on the received splitting information;

associate the at least one logical port for the slice with a slice container;

apply the constraints for the slice on the at least one logical port;

generate a routing table for the slice based on the received computed result and the constraints; and compute at least one tunnel according to the routing table for the slice based on the slice requirements of the slice.

In an embodiment, the slice container at least comprises information on the at least one logical port and the at least one slice.

In an embodiment, one slice contains the at least one logical port in the controlled node.

In an embodiment, the physical port being split into the at least one logical port carries slice information.

In an embodiment, the slice profile contains at least one of:

a number of the at least one slice;

bandwidth for each of the at least one slice;

latency for each of the at least one slice.

In an embodiment, the constraints for the slice refer to bandwidth and/or latency for the slice.

In an embodiment, the slice profile further contains a prefix list and/or a media access control 'MAC' list, wherein the prefix list and/or the MAC list can be empty.

In an embodiment, the controlled node is configured as an intermediate node.

In an embodiment, the controlled node is configured as an edge node, and the instructions which, when executed by the at least one processor, further cause the control node to:

resolve, in the at least one tunnel in one slice container, routes of at least one slice traffic included in at least one virtual private network 'VPN'.

In an embodiment, the slice container is configured as one-to-one mapping with an Interior Gateway Protocol 'IGP' instance, and the instructions which, when executed by the at least one processor, cause the control node to resolve, in the at least one tunnel in one slice container, the routes of the at least one slice traffic included in at least one VPN further cause the control node to:

configure a boarder gateway protocol 'BGP' route policy to filter the prefix list and/or the MAC list, in order to map between the at least one VPN and the at least one slice; and ignore the 'BGP' route policy when the prefix list and/or the MAC list are empty.

In an embodiment, the slice container is configured as a plurality of Interior Gateway Protocol 'IGP' containers included in one slice instance, and the instructions which, when executed by the at least one processor, cause the control node to resolve, in the at least one tunnel in one slice container, the routes of the at least one slice traffic included in at least one VPN further cause the control node to:

configure a boarder gateway protocol 'BGP' message with an extension field which indicates mapping between prefixes and the at least one slice based on the slice profile and is included in a last field of the BGP message, in order to map between the at least one VPN and the at least one slice.

According to another aspect of the present disclosure, a controlled node is provided, comprising:

a transceiver, configured to receive, from a control node, a computed result of logical topology for each slice on a physical topology composed by controlled nodes under control of the control node, and splitting information and constraints for each slice, wherein the computed result is computed according to a slice profile which defines slice requirements of at least one slice, the splitting information and the constraints for each slice are respectively generated based on the computed result, and the splitting information indicates the controlled node to split a physical port into at least one logical port for each slice;

a splitting unit, configured to split a physical port into the at least one logical port for a slice based on the received splitting information;

an association unit, configured to associate the at least one logical port for the slice with a slice container;

an application unit, configured to apply the constraints for the slice on the at least one logical port;

a generation unit, configured to generate a routing table for the slice based on the received computed result and the constraints; and a computation unit, configured to compute at least one tunnel according to the routing table for the slice based on the slice requirements of the slice.

In an embodiment, the slice container at least comprises information on the at least one logical port and the at least one slice.

In an embodiment, one slice contains the at least one logical port in the controlled node.

In an embodiment, the physical port being split into the at least one logical port carries slice information.

In an embodiment, the slice profile contains at least one of:

a number of the at least one slice;
bandwidth for each of the at least one slice;
latency for each of the at least one slice.

In an embodiment, the constraints for the slice refer to bandwidth and/or latency for the slice.

In an embodiment, the slice profile further contains a prefix list and/or a media access control 'MAC' list, wherein the prefix list and/or the MAC list can be empty.

In an embodiment, the controlled node is configured as an intermediate node.

In an embodiment, the controlled node is configured as an edge node, and the controlled node further comprises:

a resolving unit, configured to resolve, in the at least one tunnel in one slice container, routes of at least one slice traffic included in at least one virtual private network 'VPN'.

In an embodiment, the slice container is configured as one-to-one mapping with an Interior Gateway Protocol 'IGP' instance, and the resolving unit is further configured to:

configure a boarder gateway protocol 'BGP' route policy to filter the prefix list and/or the MAC list, in order to map between the at least one VPN and the at least one slice; and ignore the 'BGP' route policy when the prefix list and/or the MAC list are empty.

In an embodiment, the slice container is configured as a plurality of Interior Gateway Protocol 'IGP' containers included in one slice instance, and the resolving unit is further configured to:

configure a boarder gateway protocol 'BGP' message with an extension field which indicates mapping between prefixes and the at least one slice based on the slice profile and is included in a last field of the BGP message, in order to map between the at least one VPN and the at least one slice.

According to another aspect of the present disclosure, a computer readable medium is provided, which stores computer program comprising instructions which, when executed on at least one processor, cause the at least one processor to perform any one of the previous methods in the control node.

According to another aspect of the present disclosure, a computer readable medium is provided, which stores computer program comprising instructions which, when executed on at least one processor, cause the at least one processor to perform any one of the previous methods in the controlled node.

The technical solutions of the present disclosure may at least have beneficial effects as follows.

Each tunnel from one PE to another PE is setup, and has at least one mapping with each slice. As a consequence, it allows creating and managing the slice in the transport network;

The explicit slice representation in the transport network conforms to slice-specific service assurance e.g. QoS;

The slices are enabled to operate in parallel without mutual impact among different slices.

End-to-end resource management may be provided for the slice; and

The proposed technical solutions may support both the traditional network with LDP/RSVP/RSVP-TE deployment and the SDN based on the segment routing.

BRIEF DESCRIPTION OF THE DRAWINGS

The objects, advantages and characteristics of the present disclosure will be more apparent, according to descriptions of preferred embodiments in connection with the drawings, on which.

Figure 1:
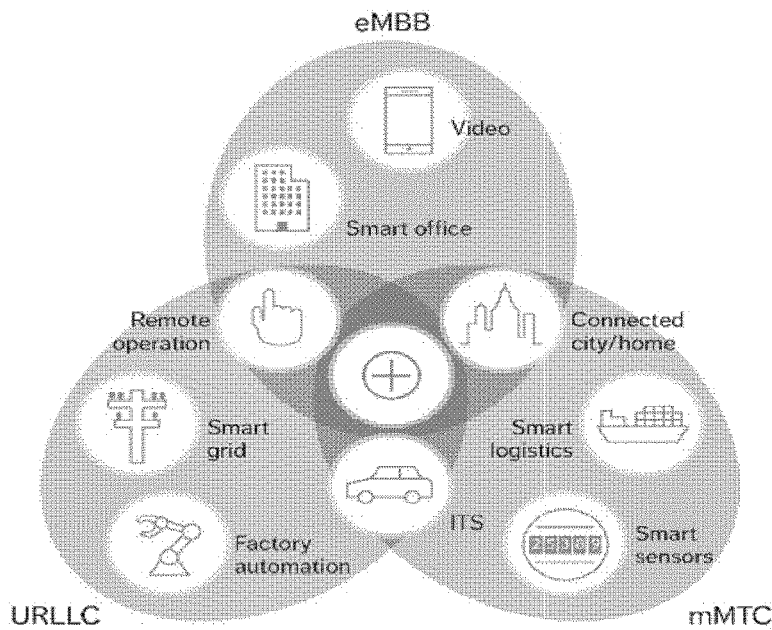
FIG. 1 illustratively shows three scenarios that network slicing technology may be applied.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA, LTE and other networks developed in the future. The terms "network" and "system" are often used interchangeably. For illustration only, certain aspects of the techniques are described below for the next, i.e. the 5$^{th}$ generation of wireless communication network. However, it will be appreciated by the skilled in the art that the techniques described herein may also be used for other wireless networks such as LTE and corresponding radio technologies mentioned herein as well as wireless networks and radio technologies proposed in the future.

As used herein, the term "node" refers to any of entities capable of performing routing-related operations in any of communication networks. By way of example and not limitation, the node may be configured as a control node, a controlled node etc. The control node, such as a SDN control node, may be configured to control the controlled node to establish a tunnel. The controlled node, such as a PE node, a P (Provider) node, may be configured to establish a tunnel based on interactions with the control node and other controlled node.

The basic idea of the present disclosure consists in establishing a tunnel for each slice, so that the service assurance, e.g. QoS, can be conformed on the specific slice. In order to establish the tunnel for each slice, exact mapping between the VPNs and the slices is also required to be established.

Hereinafter, a method at a control node used in establishing a tunnel for each slice according to an exemplary embodiment of the present disclosure will be described with reference to FIG. 2.

Figure 2:
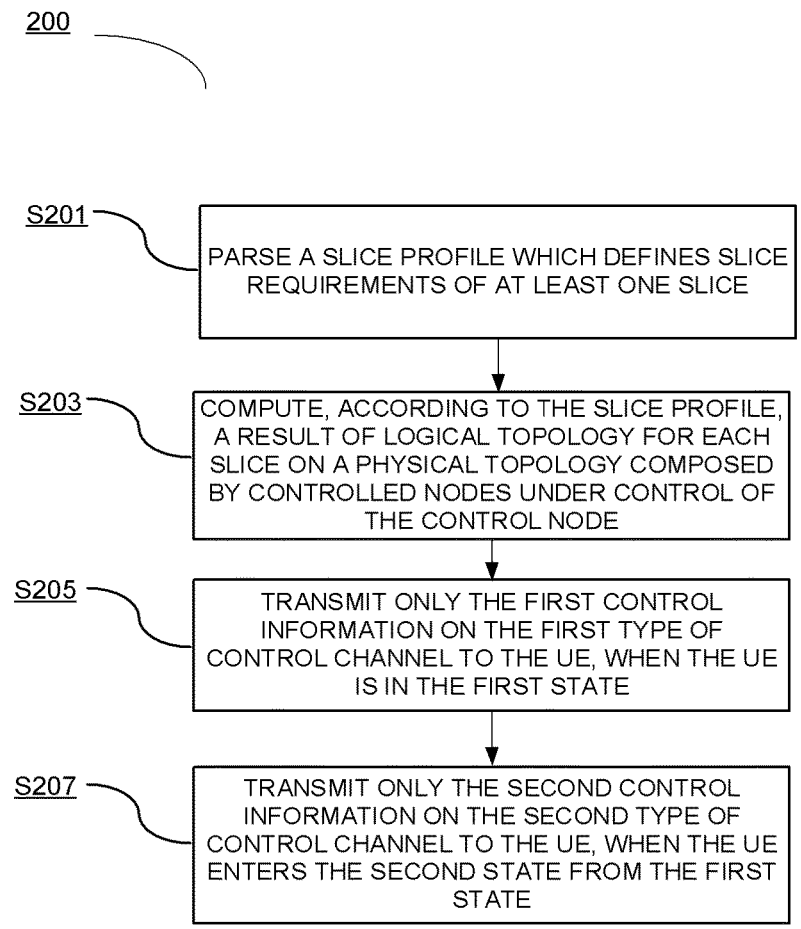
FIG. 2 illustratively a flowchart of a method at a control node according to an exemplary embodiment of the present disclosure.

FIG. 2 illustratively shows a flowchart of a method 200 used in establishing a tunnel for each slice according to an exemplary embodiment of the present disclosure, which is performed at a control node, such as a SDN control node.

As shown in FIG. 2, the method 200 at the control node may comprise steps S201, S203, S205 and S207.

In step S201, the control node may parse a slice profile which defines slice requirements of at least one slice.

The slice profile may be predetermined or received from a source external to the control node, and may contain at least one of:

a slice list, or a number of the at least one slice;

a slice definition, which includes a prefix list and/or a MAC (Media Access Control) list, wherein the prefix list and/or the MAC list can be empty;

a bandwidth for each of the at least one slice;

a latency for each of the at least one slice;

TBD (To Be Defined).

In step S203, the control node may compute, according to the slice profile, a result of logical topology for each slice on a physical topology composed by controlled nodes under control of the control node.

In step S205, the control node may generate splitting information for indicating a controlled node to split a physical port into at least one logical port for each slice and constraints of the at least one logical port for each slice, based on the computed result of logical topology for each slice. As should be understood, not all of the physical ports need to be split into the logical ports, e.g., a physical port which does not carry slice information will not be split into the logical ports. That is, the physical port that carries slice information is indicated to be split into the at least one logical port.

Each slice contains the at least one logical port for the slice in the controlled node. The constraints refer to the bandwidth and/or the latency etc. for each slice.

In step S207, the control node may transmit the computed result, the splitting information and the constraints for each slice as described above to the controlled node.

Hereinafter, a method at a controlled node used in establishing a tunnel for each slice according to an exemplary embodiment of the present disclosure will be described with reference to FIG. 3.

Figure 3:
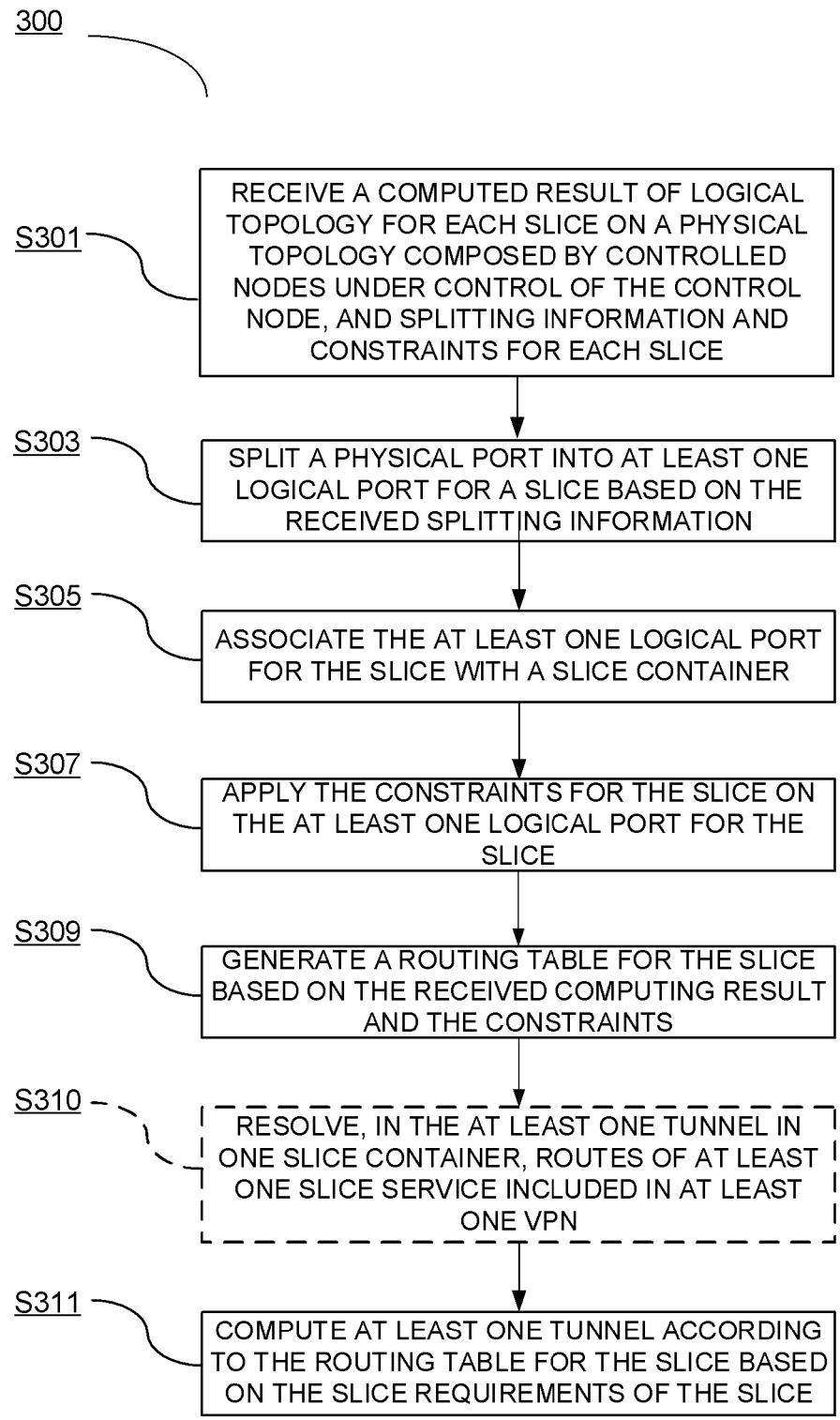
FIG. 3 illustratively shows a flowchart of a method at a controlled node according to an exemplary embodiment of the present disclosure.

FIG. 3 illustratively shows a flowchart of a method 300 used in establishing a tunnel for each slice according to an exemplary embodiment of the present disclosure, which is performed at a control node, such as a PE node, a P node, etc.

As shown in FIG. 3, the method 300 at the controlled node may comprise steps S301, S303, S305, S307 and S309.

In step S301, the controlled node may receive, from a control node, a computed result of logical topology for each slice on a physical topology composed by controlled nodes under control of the control node, and splitting information and constraints for each slice.

As known from the above description related to the control node, the computed result may be computed by the control node according to a slice profile which defines slice requirements of at least one slice.

The slice profile may be predetermined or received from a source external to the control node, and may contain at least one of:

a slice list, or a number of the at least one slice;

a slice definition, which includes a prefix list and/or a MAC (Media Access Control) list, wherein the prefix list and/or the MAC list can be empty;

a bandwidth for each of the at least one slice;

a latency for each of the at least one slice;

TBD (To Be Defined).

The splitting information and the constraints for each slice may be respectively generated by the control node based on the computed result. The splitting information generated by the control node may indicate the controlled node to split a physical port into at least one logical port.

In step S303, the controlled node may split a physical port into at least one logical port for a slice based on the received splitting information. As previously discussed, not all of the physical ports need to be split into the logical ports, e.g., a physical port which does not carry slice information is not necessary to be split into the logical ports. That is, the physical port that carries slice information is indicated to be split into the at least one logical port.

Each slice contains the at least one logical port for the slice in the controlled node.

In step S305, the controlled node may associate the at least one logical port for the slice with a slice container.

As previously described, the container is an instance of a virtual router, and has its own management domain, Authentication, Authorization, and Accounting (AAA) name space, IP address space, and routing protocols. The slice containers may be created and deleted with configuration commands. The slice containers share common resources, such as memory and processor cycles, but each slice container functions independently of all other slice containers configured on the router.

A slice container may be configured as one-to-one mapping with an IGP instance or may be configured as a number of IGP instances included in one container.

In step S307, the controlled node may apply the constraints for the slice on the at least one logical port for the slice. The constraints may refer to the bandwidth and/or the latency etc. for the slice.

In step S309, the controlled node may generate a routing table for the slice based on the received computed result and the constraints.

In an embodiment, the controlled node may be configured as a PE node, and the method 300 may further comprise step S310 which is shown in a dashed box. In step S310, the controlled node, i.e., the PE node, may resolve, in the at least one tunnel in one slice container, routes of at least one slice traffic included in at least one VPN.

In one implementation of the slice container, the slice container may be configured as one-to-one mapping with IGP instance. In this implementation, in step S310, the controlled node may particularly configure a BGP route policy to filter the prefix list and/or the MAC list in the slice profile, in order to map between the at least one VPN and the at least one slice, which will be described in detail later with reference to FIG. 5; and may ignore the BGP route policy when the prefix list and/or the MAC list are empty.

In another implementation of the slice container, it may be configured as a number of IGP instances included in one slice container. In this implementation, in step S310, the controlled node may particularly configure a BGP message with an extension field which indicates mapping between prefixes and the at least one slice based on the slice profile and is included in a last field of the BGP message, in order to map between the at least one VPN and the at least one slice, which will be described in detail later with reference to FIG. 8.

In another embodiment, the controlled node may be configured as a P node. The P node, as an intermediate node between two PE nodes, relay slice by interactions with the PE or P node, and thus does not need such a resolving step S310 for the PE node.

In step S311, the controlled node may compute at least one tunnel according to the routing table for the slice based on the slice requirements of the slice in the slice container.

As such, a tunnel which may fulfill the requirements of the slice may be established for the slice. Accordingly, at least one such tunnel may be established for each slice. Then, a slice-specific service assurance, e.g. QoS, can be applied to the specific slice based on the requirements of the specific slice.

Otherwise, if the segment routing is not enabled in the controlled node, the controlled node may configure traditional MPLS development based on LDP/RSVP/RSVP-TE.

Figure 4:
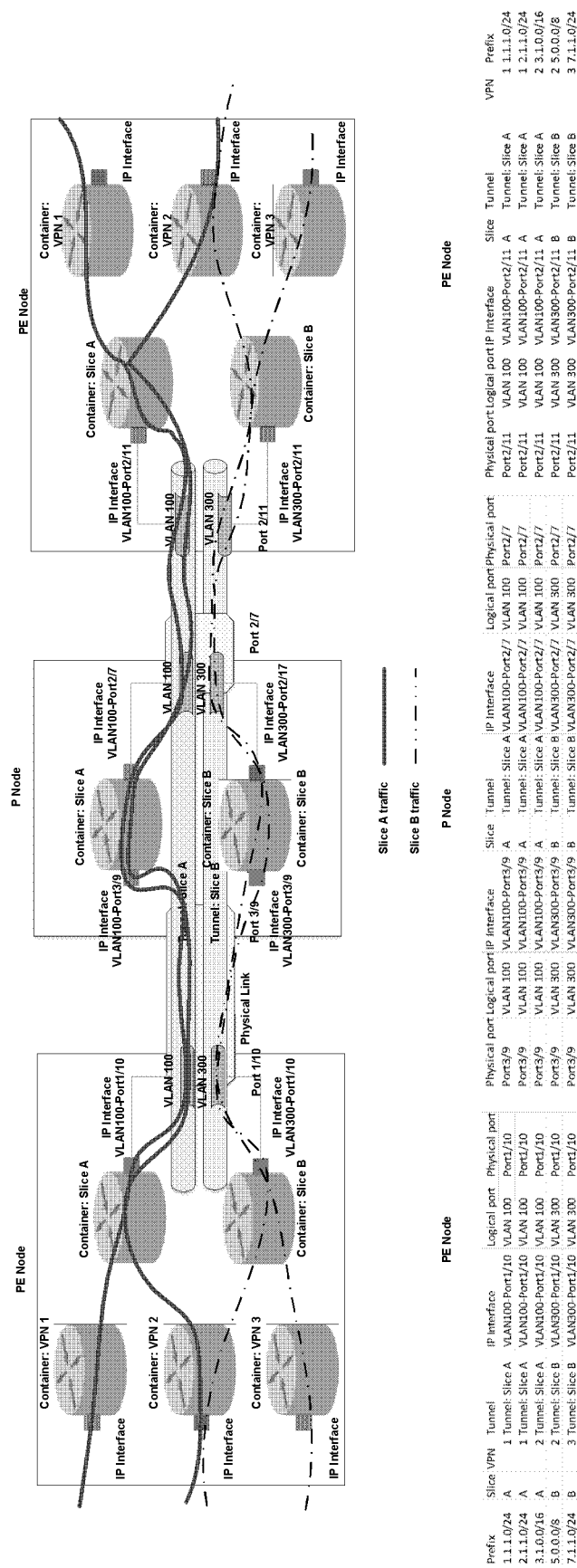
FIG. 4 illustratively shows a high-level structure of how to support network slicing in a transport network according to an exemplary embodiment of the present disclosure.

FIG. 4 illustratively shows a high level structure of how to support network slicing in a transport network according to an exemplary embodiment of the present disclosure. In the embodiment of FIG. 4, the slice container may be configured as one-to-one mapping with IGP instance Container: VPN A PE router may maintain a separate VPN container for each VPN connection. Each customer connection is mapped to a specific VPN container. The router may be configured as a PE node or router with multiple VPN containers to support segregation of routing information per VPN. Slice is customer traffic. Slice and VPN mapping is flexible, which means many to many. In FIG. 4, it illustrates that Container VPN 2 contains both slice A and slice B traffic. Container VPN doesn't have MPLS capability.

Container Slice (Also Referred to as Slice Instance, Slice Container)

Container Slice is a standard container with additional MPLS capability.

Tunnel Slice

It is a one-to-one mapping between each tunnel and each slice. Each slice traffic is carried by one tunnel established by protocols of container slice in each hop.

Physical Link

A link is a connection between nodes. The two ends of the link can be port or LAG (Link Aggregation Group). A port or LAG can be split into VLAN logical ports.

Accordingly, a logical link can be established based on VLAN. A VLAN-based logical port is associated with a L3 interface in Container Slice.

Figure 5:
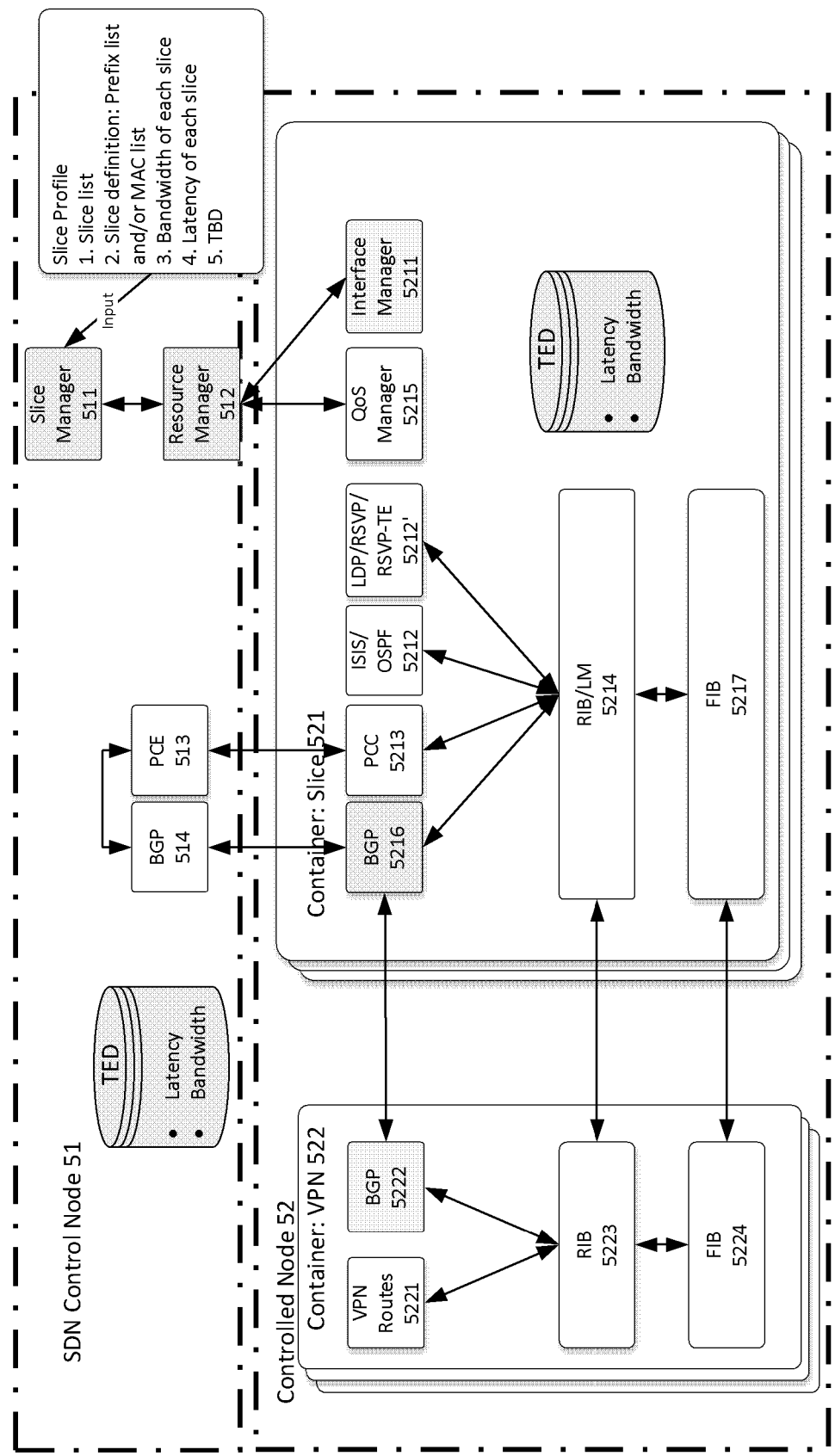
FIG. 5 illustratively shows a schematic system diagram including a control node and a controlled node according to an exemplary embodiment of the present disclosure.
Figure 6A:
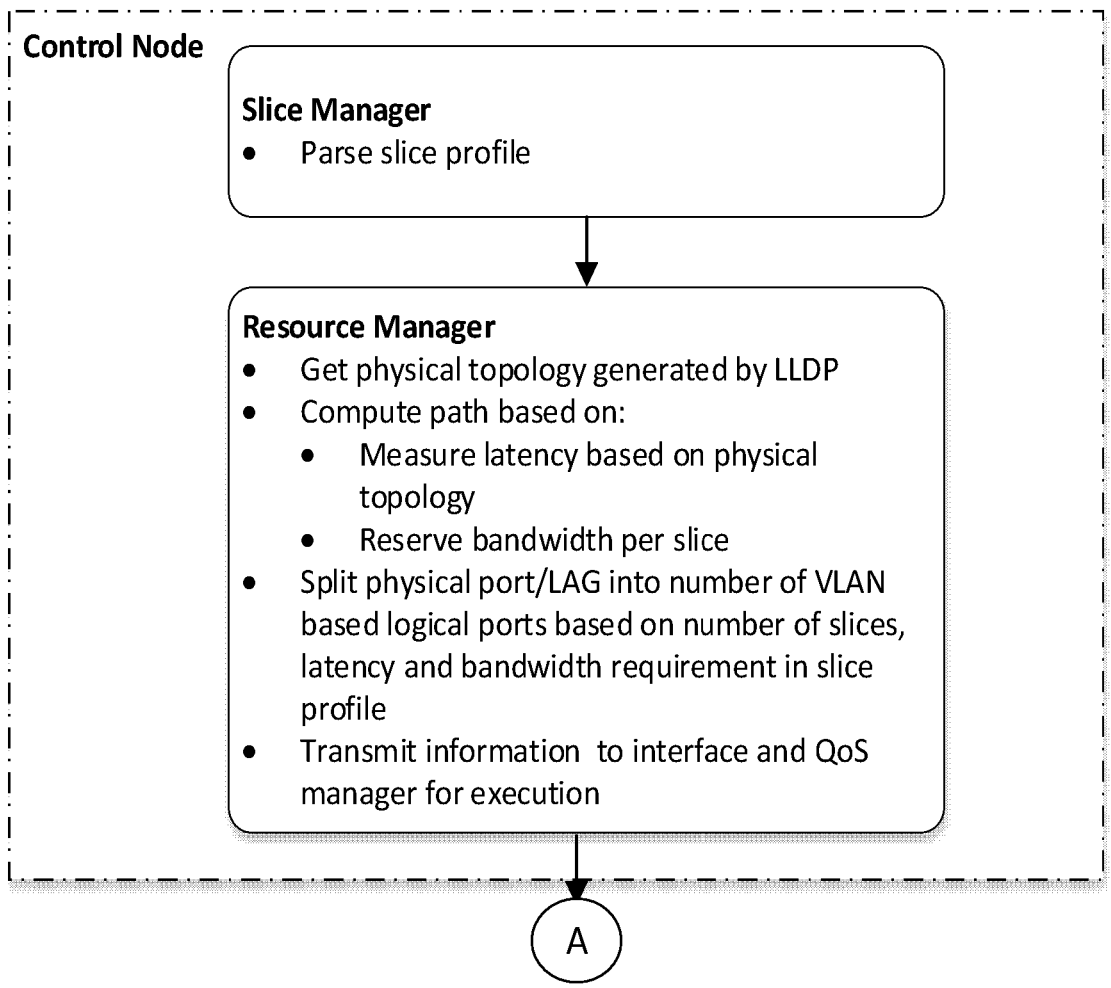
FIGS. 6a-6c illustratively show schematic flowcharts of respective modules in the schematic system diagram as shown in FIG. 5.
Figure 6B:
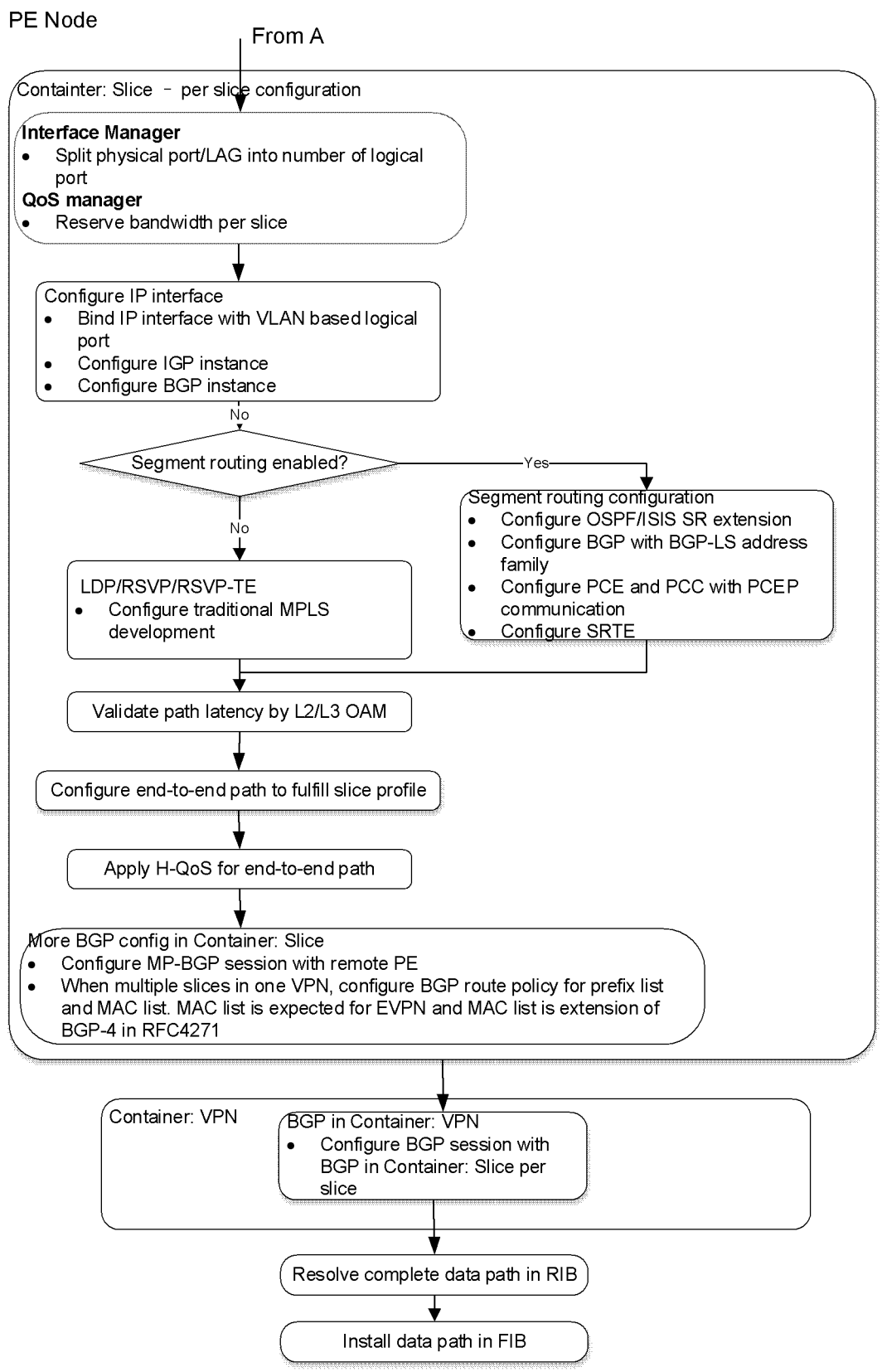
Figure 6C:
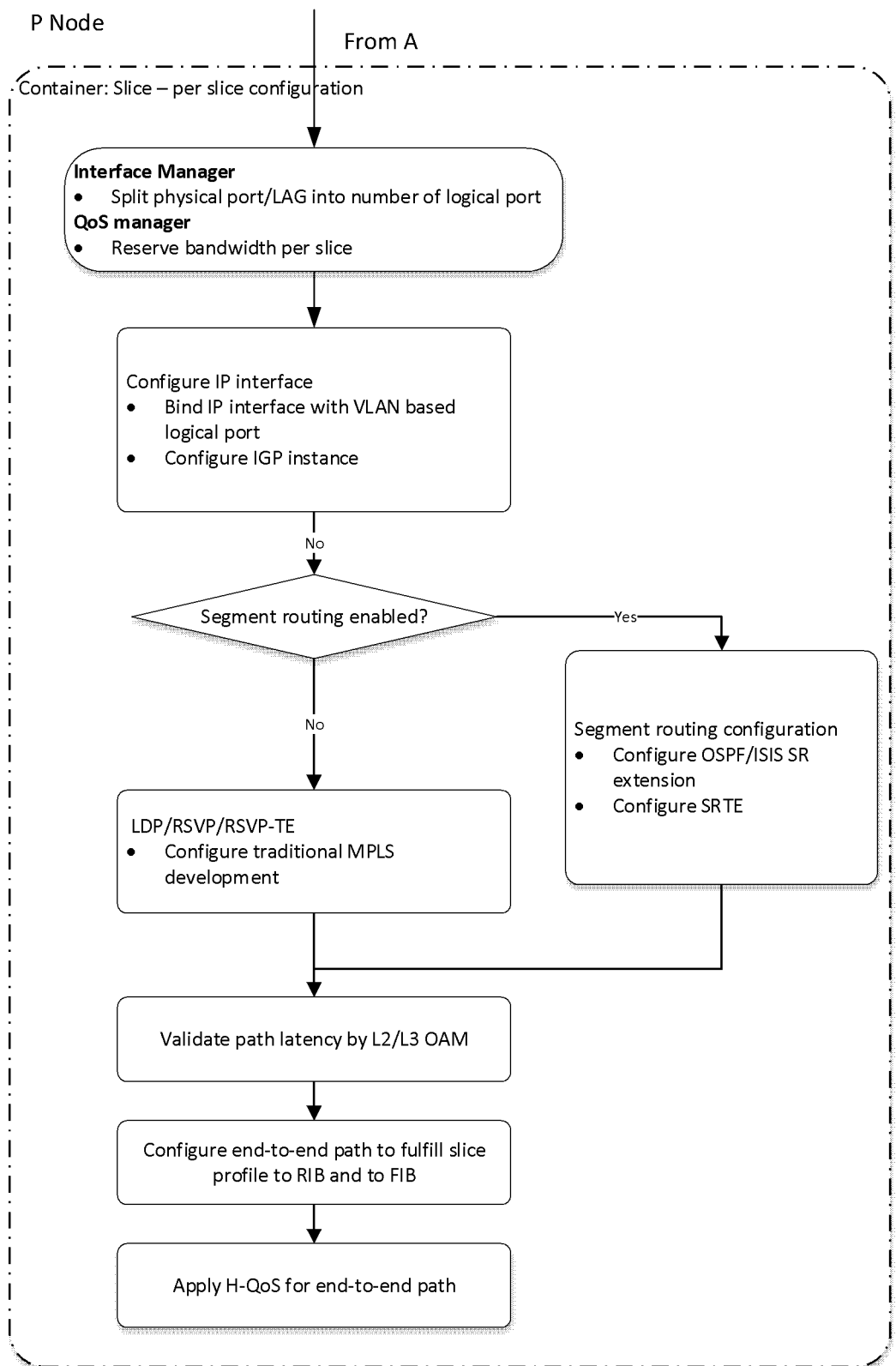

FIG. 5 illustratively shows a schematic system diagram including a control node (shown as SDN control node 51 in FIG. 5) and a controlled node 52 according to an exemplary embodiment of the present disclosure, and FIGS. 6A-6C illustratively show schematic flowcharts of respective modules in the schematic system diagram as shown in FIG. 5. In the embodiment of FIGS. 5 and 6A-6C, the slice container may be configured as one-to-one mapping with IGP instance.

As shown in FIG. 5, the SDN control node 51 may comprise following modules:

Slice Manager 511
 Configured to parse the slice profile, and generate a configuration list.
Resource Manager 512
 Configured to:
  get physical topology generated by LLDP;
  compute path based on:
   measure latency based on physical topology,
   reserve bandwidth per slice;
  split physical port/LAG into number of VLAN based logical ports based on number of slices, latency and bandwidth requirement in slice profile;
  transmit information to interface and QoS manager for execution.
PCE Module 513
 Configured to calculate a tunnel based on the requirements of the slice from the slice profile, and indicate the controlled node 52 to establish the tunnel through a PCC module 5213 of the controlled node 52.

The BGP module 514

Configured to synchronize ISIS/OSPF LSDB with segment routing extension from a Container Slice module 521 to the SDN control node 51 via BGP-LS.

The controlled node 52 may comprise a Container Slice module 521 and a Container VPN module 522.

The Container Slice module 521 may comprise following modules:

Interface Manager 5211

Configured to establish logical interface on physical interface and associate the logical interface with L3 interface for further routes calculation in routing protocols. Logical link is established based on logical interface. Hop by hop logical links map to one end-to-end tunnel and finally map to one slice.

LDP/RSVP/RSVP-TE Module 5212'

LDP/RSVP/RSVP-TE are traditional solutions for LSP setup. It is mutual exclusion with segment routing.

ISIS/OSPF Module 5212

Configured to setup a tunnel as replacement of traditional LDP/RSVP/RSVP-TE.

PCC 5213

Configured to receive path setup instruction from PCE in SDN controller and install path into data plane.

RIB/LM Module 5214

Configured to select best path (routes plus LSP) calculated from routing protocols. The RIB in Container: Slice works together with RIB in Container: VPN to resolve the tunnel.

QoS Manager 5215

Configured to apply QoS including hierarchical QoS on the tunnel. In our case the tunnel is one-to-one mapping with the slice, which means QoS applies on slice as well.

BGP Module 5216

Configured to synchronize VPN routes (for EVPN it is MACs) with local BGP neighbor in Container: VPN. And setup MP-BGP session with remote PE to synchronize VPN routes. Here BGP routing policy, e.g. with parameter prefix list, distribution list and MAC list for EVPN, can be applied to control routes advertisement between neighbors to control prefix list contained in one slice. This is one important configuration to separate slice in different context. Besides VPN routes synchronization, it establishes BGP-LS session with BGP neighbor in SDN controller for segment routing case.

FIB Module 5217

Configured to interwork with FIB in Container: VPN to establish data plane for slice traffic.

The Container VPN module 522 (many to many mapping with Container Slice) may comprise following modules:

VPN Route Module 5221

Configured to synchronize VPN routes (for EVPN it is MACs) from CE to PE

BGP Module 5222

Configured to synchronize VPN routes (for EVPN it is MACs) with local Container: Slice. When multiple slices traffic contains in one VPN in order to direct traffic into separated path several BGP sessions can be established between Container: VPN and all other Container: Slice.

RIB Module 5223

Configured to select best routes calculated by BGP and resolve outgoing interface. And works together with RIB in Container: Slice to resolve the tunnel.

FIB Module 5224

Configured to interwork with FIB in Container: Slice to establish data plane for slice traffic.

Figure 7:
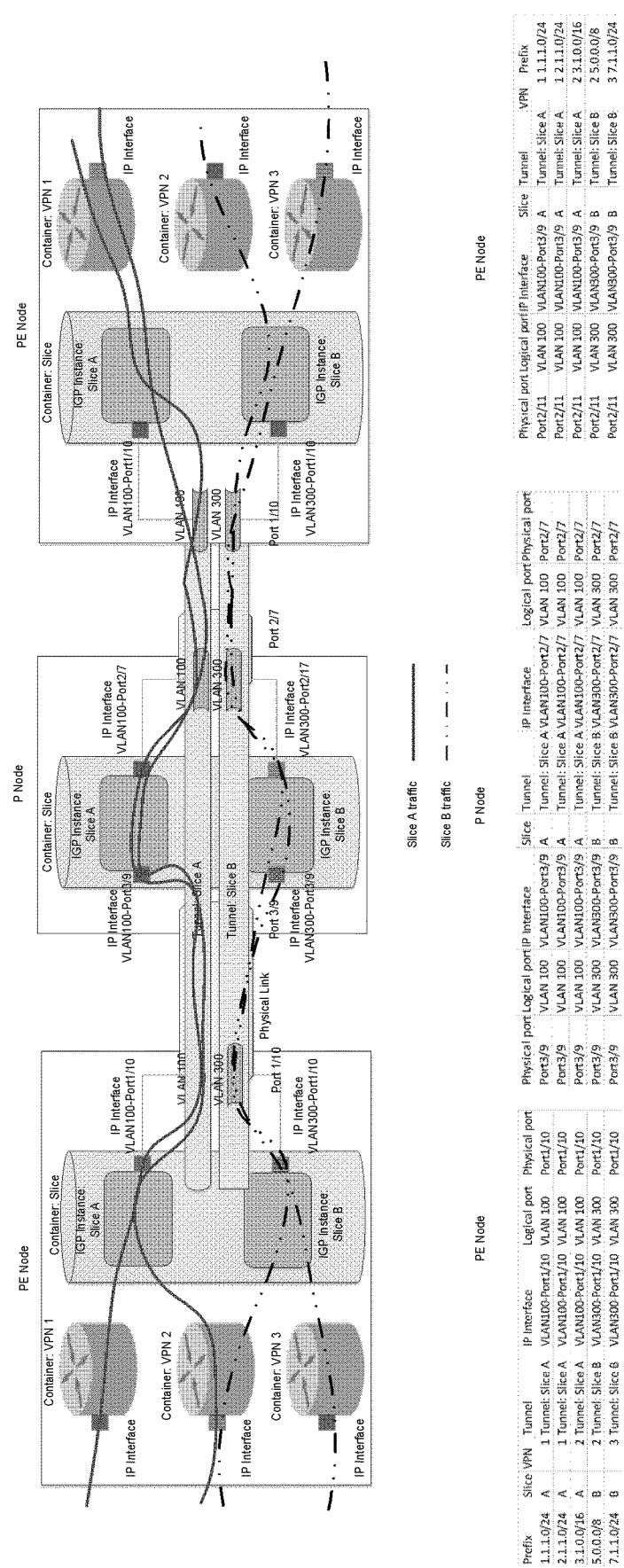
FIG. 7 illustratively shows a high-level structure of how to support network slicing in a transport network according to another exemplary embodiment of the present disclosure.

FIG. 7 illustratively shows a high-level structure of how to support network slicing in a transport network according to another exemplary embodiment of the present disclosure. In the embodiment of FIG. 7, the slice container is configured as an IGP container included in one slice instance.

Container VPN

A PE router may maintain a separate VPN context for each VPN connection. Each customer connection is mapped to a specific VPN context. You can configure the router as a PE node or router with multiple VPN contexts to support segregation of routing information per VPN. Slice is customer traffic. Slice and VPN mapping is flexible, which means many to many. In above figure it illustrates that Container VPN 2 contains both slice A and slice B traffic. Container VPN doesn't have MPLS capability.

IGP Instance

Allocate segment identifier based on IGP.

Tunnel Slice

It is one-to-one mapping with each slice. Each slice traffic is carried by a tunnel established by protocols of context slice in each hop.

Physical Link

A link is a connection between nodes. The two ends of the link can be port or LAG (Link Aggregation Group). A port or LAG can be split into VLAN logical ports. Accordingly, a logical link can be established based on VLAN. A VLAN-based logical port is associated with a L3 interface in Container Slice.

Figure 8:
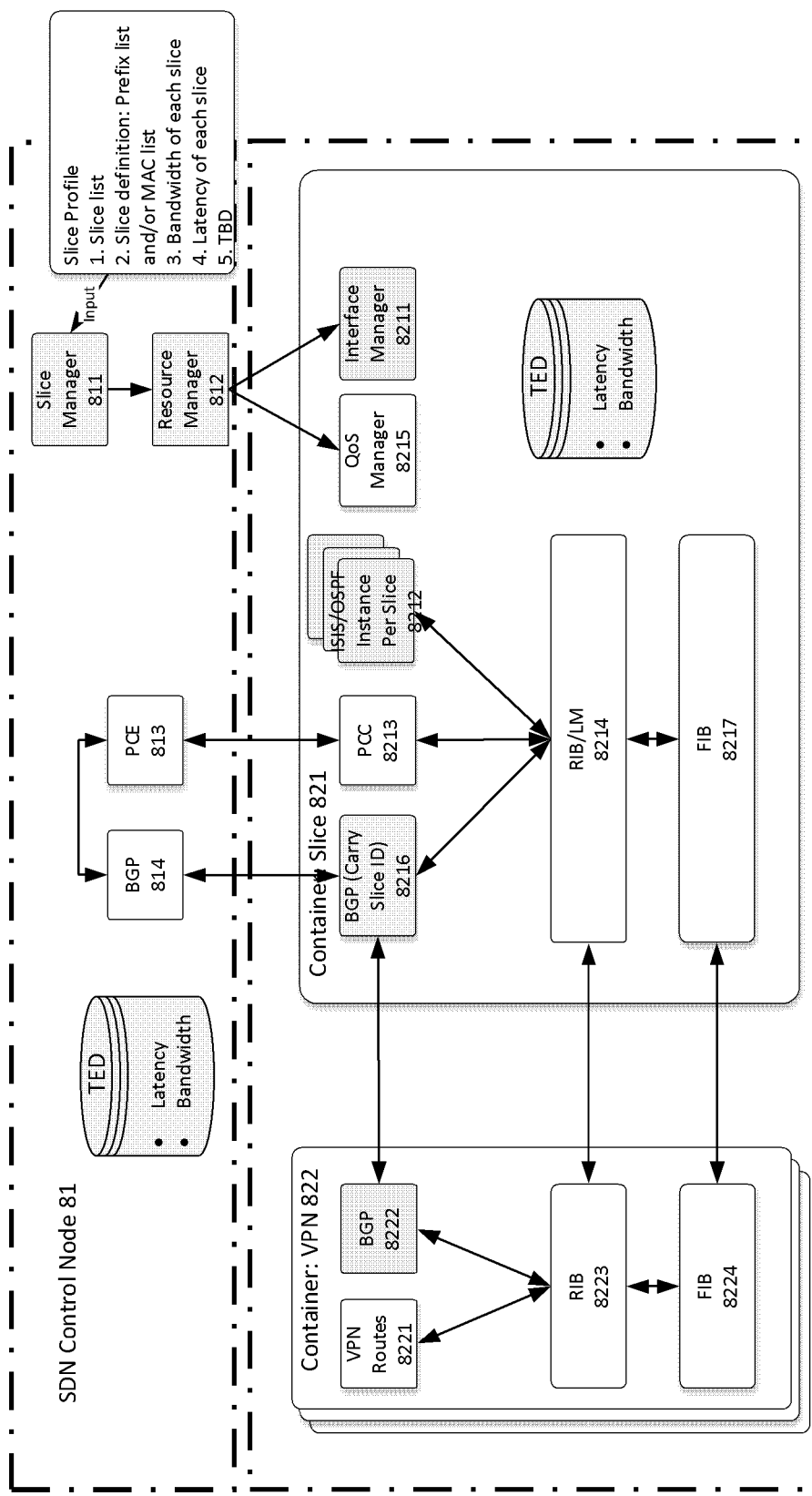
FIG. 8 illustratively shows a schematic system diagram including a control node and a controlled node according to another exemplary embodiment of the present disclosure.
Figure 9A:
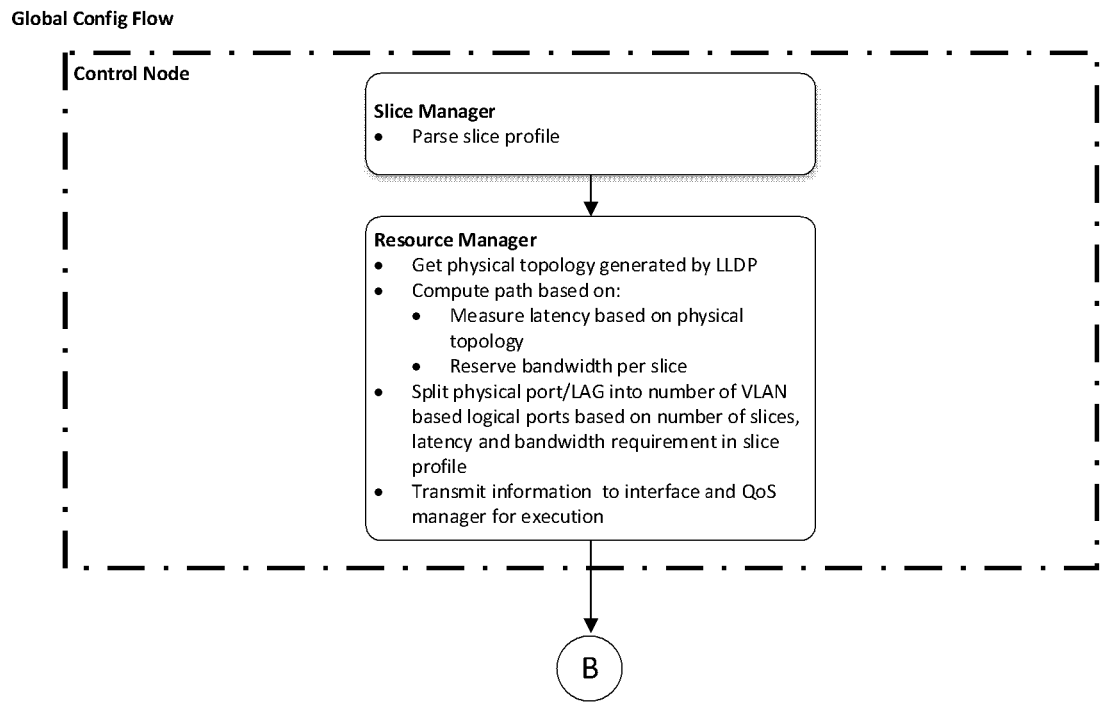
FIGS. 9a-9c illustratively show schematic flowcharts of respective modules in the schematic system diagram as shown in FIG. 8
Figure 9B:
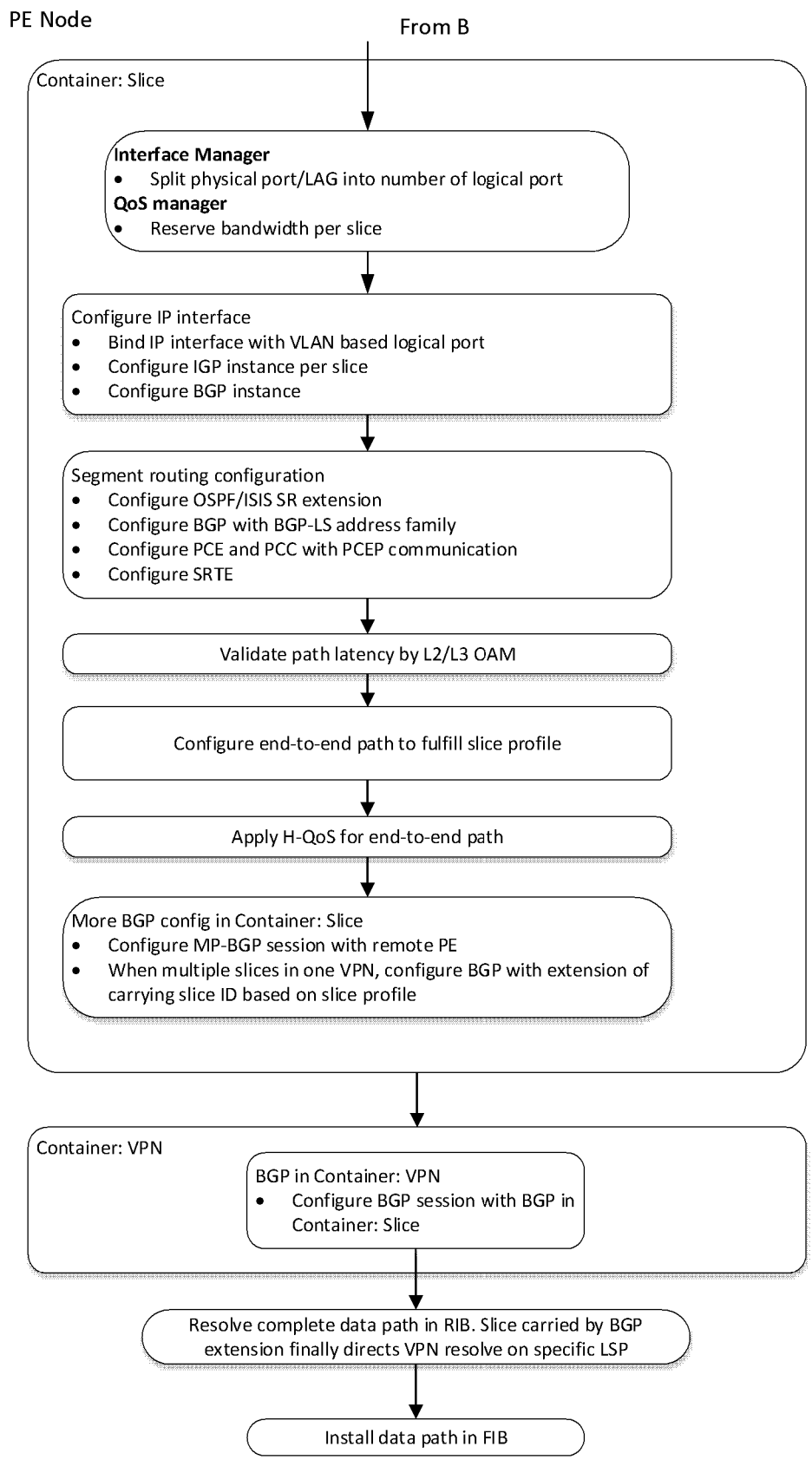
Figure 9C:
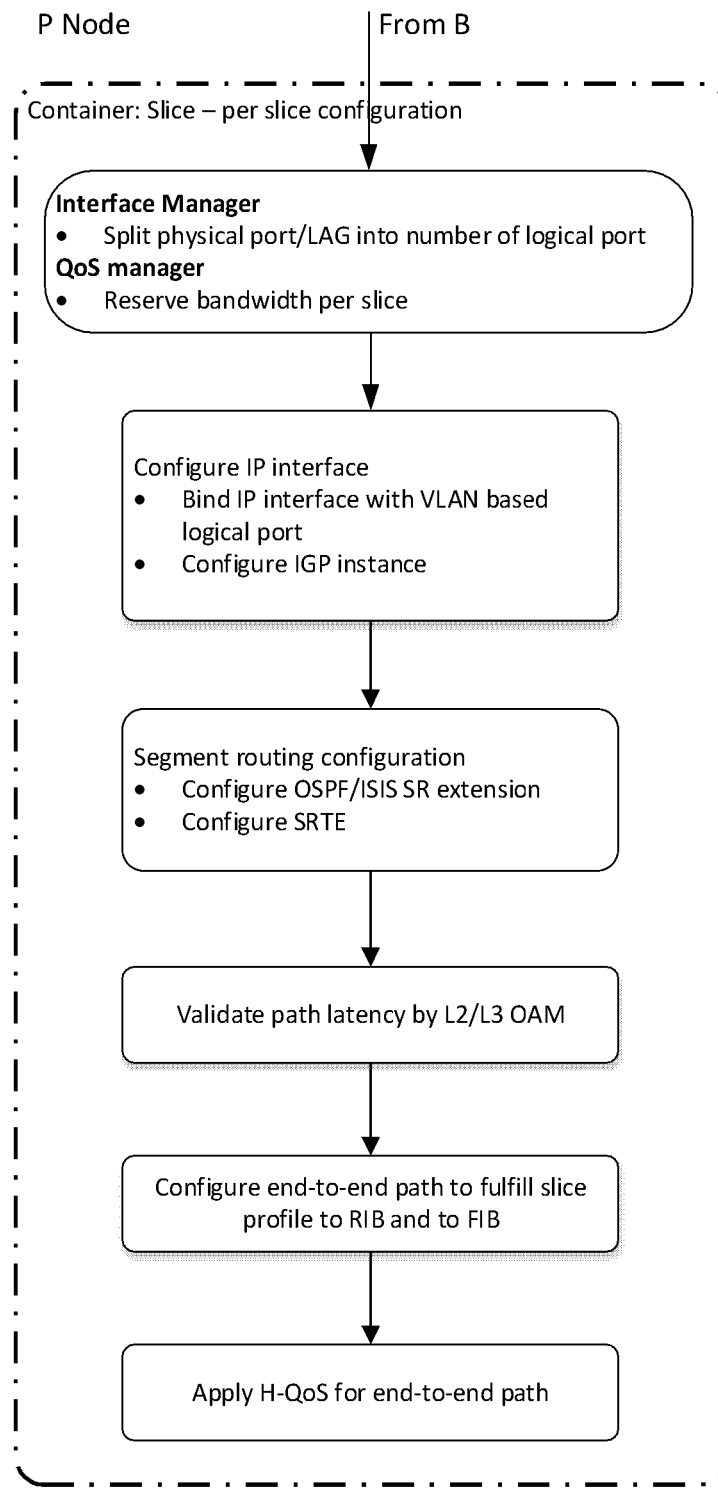

FIG. 8 illustratively shows a schematic system diagram including a control node (shown as SDN control node 81 in FIG. 8) and a controlled node 82 according to another exemplary embodiment of the present disclosure, and FIGS. 9a-9c illustratively show schematic flowcharts of respective modules in the schematic system diagram as shown in FIG. 8. In the embodiment of FIGS. 8 and 9a-9c, the slice container is configured as an IGP container included in one slice instance.

As shown in FIG. 8, the SDN control node 81 may comprise following modules:

Slice Manager 811

Configured to parse the slice profile, and generate a configuration list.

Resource Manager 812

Configured to:
get physical topology generated by LLDP;
compute path based on:
measure latency based on physical topology,
reserve bandwidth per slice;
split physical port/LAG into number of VLAN based logical ports based on number of slices, latency and bandwidth requirement in slice profile;
transmit information to interface and QoS manager for execution.

PCE module 813

Configured to calculate a tunnel based on the requirements of the slice from the slice profile, and indicate the controlled node 82 to establish the tunnel through a PCC module 8213 of the controlled node 82.

BGP module 814
Configured to synchronize ISIS/OSPF LSDB with segment routing extension from a Container Slice module 821 to the SDN control node 81 via BGP-LS.

The controlled node 82 may comprise a Container Slice module 821 and a Container VPN module 822.

The Container Slice module 821 may comprise following modules:

Interface Manager 8211
  Configured to establish logical interface on physical interface and associate the logical interface with L3 interface for further routes calculation in routing protocols. Logical link is established based on logical interface. Hop by hop logical links map to one end-to-end tunnel and finally map to one slice.

ISIS/OSPF Module 8212
  Configured to setup a tunnel with segment routing extension; multiple ISIS/OSPF will be running in Container: Slice. Each ISIS/OSPF instance will be associated with one logical port through IP interface. We will assign number of Node Segment ID for each node based on number of slices. ISIS/OSPF will advertise the Node Segment ID throughout the entire network.

PCC 8213
  Configured to receive path setup instruction from PCE in SDN controller and install path into data plane.

RIB/LM Module 8214
  Configured to select best path (routes plus LSP) calculated from routing protocols. The RIB in Container: Slice works together with RIB in Container: VPN to resolve the tunnel.

QoS Manager 8215
  Configured to apply QoS including hierarchical QoS on the tunnel. In our case the tunnel is one-to-one mapping with the slice, which means QoS applies on slice as well.

BGP model 8216
  Configured to synchronize VPN routes with local BGP neighbor in Container: VPN; and setup MP-BGP session with remote PE to synchronize VPN routes. When BGP advertise routes it carries both prefix/label mapping and prefix/slice mapping. The prefix/slice mapping is new extension of current BGP.

As we know with RFC4760, structures of BGP messages, such as Multiprotocol Reachable NLRI (MP_REACH_NLRI) and Multiprotocol Unreachable NLRI (MP_UNREACH_NLRI), are shown below.

The first one (MP_REACH_NLRI) is used to carry the set of reachable destinations together with the next hop information to be used for forwarding to these destinations. The second one (MP_UNREACH_NLRI) is used to carry the set of unreachable destinations. Both of these attributes are optional and non-transitive. This way, a BGP speaker that doesn't support the multiprotocol capabilities will just ignore the information carried in these attributes and will not pass it to other BGP speakers.

Multiprotocol Reachable NLRI-MP_REACH_NLRI (Type Code 14):

```
+--------------------------------+
| Address Family Identifier (2 octets)           |
+--------------------------------+
| Subsequent Address Family Identifier (1 octet) |
+--------------------------------+
| Length of Next Hop Network Address (1 octet)   |
+--------------------------------+
| Network Address of Next Hop (variable)         |
+--------------------------------+
| Reserved (1 octet)                             |
+--------------------------------+
| Network Layer Reachability Information (variable) |
+--------------------------------+
```

Multiprotocol Unreachable NLRI-MP_UNREACH_NLRI (Type Code 15):

```
+--------------------------------+
| Address Family Identifier (2 octets)           |
+--------------------------------+
| Subsequent Address Family Identifier (1 octet) |
+--------------------------------+
| Withdrawn Routes (variable)                    |
+--------------------------------+
```

As previously described, in the present disclosure, the BGP message may be configured with an BGP extension field (NLRI extension) which indicates mapping between prefixes and the at least one slice based on the slice profile and is included in a last field of the BGP message, in order to map between the at least one VPN and the at least one slice.

The NLRI extension is shown as below and it is under BGP extension for L2/L3VPN (including EVPN):

The Network Layer Reachability information may be encoded as one or more triples in a form <length, slice, prefix>, whose fields are described below:

```
+------------------+
| Length (1 octet) |
+------------------+
| slice (4 octets) |
+------------------+
...................
| Prefix (variable)|
+------------------+
```

The use and the meaning of these fields are as follows:
  a) Length:
  The Length field indicates the length in bits of the address prefix plus the label(s).
  b) Slice:
  The Slice field carries one or more slice IDs and each slice ID is encoded as 4 octets.
  c) Prefix (Including MACs for EVPN):
  The Prefix field contains address prefixes followed by enough trailing bits to make the end of the field fall on an octet boundary. Note that the value of trailing bits is irrelevant.
  The Slice(s) specified for particular prefixes must be assigned by the slice profile which is defined globally.
  Besides VPN routes synchronization, it establishes BGP-LS session with BGP neighbor in SDN controller for segment routing case.

FIB Module 8217
  Configured to interwork with FIB in Container: VPN to establish data plane for slice traffic.

The Container VPN module 822 (many to many mapping with Container Slice) may comprise following modules:

VPN Route Module 8221
  Configured to synchronize VPN routes (for EVPN it is MACs) from CE to PE BGP Module 8222

Configured to synchronize VPN routes (for EVPN it is MACs) with local Container: Slice.

RIB Module 8223

Configured to select best routes calculated by BGP and resolve outgoing interface. And works together with RIB in Container: Slice to resolve the tunnel.

FIB Module 8224

Configured to interwork with FIB in Container: Slice to establish data plane for slice traffic.

Figure 10:
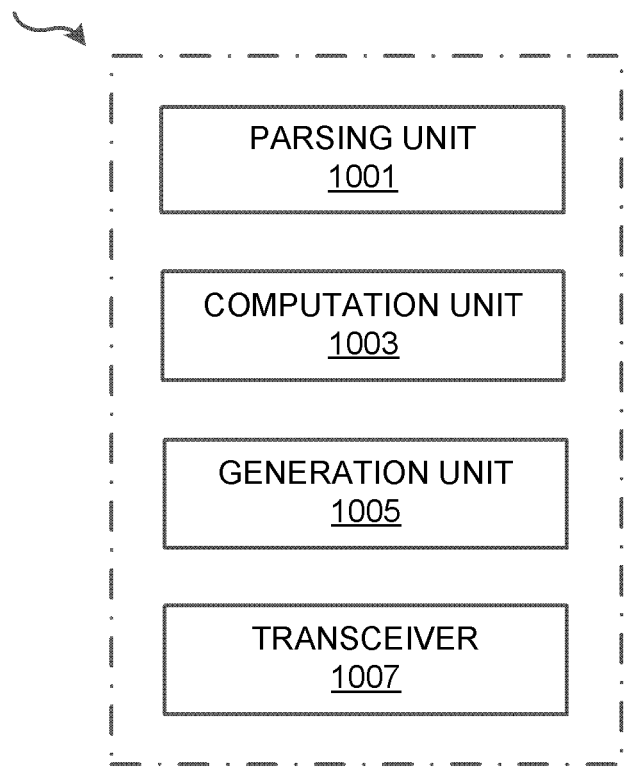
FIG. 10 illustratively shows a schematic structure diagram of a control node according to an exemplary embodiment of the present disclosure.

A structure of a control node will be described with reference to FIG. 10. FIG. 10 illustratively shows a schematic structure diagram of a control node 1000 according to an exemplary embodiment of the present disclosure. The control node 1000 in FIG. 10 may perform the method 200 described previously with reference to FIG. 2.

As shown in FIG. 10, the control node 1000 comprises a parsing unit 1001, a computation unit 1003, a generation unit 1005 and a transceiver 1007. As will be understood by the skilled in the art, common components in the control node 1000 are omitted in FIG. 10 for not obscuring the idea of the present disclosure.

The parsing unit 1001 of the control node 1000 may be configured to parse a slice profile which defines slice requirements of at least one slice.

The slice profile may be predetermined or received from a source external to the control node, and may contain at least one of:

a slice list, or a number of the at least one slice;

a slice definition, which includes a prefix list and/or a MAC (Media Access Control) list, wherein the prefix list and/or the MAC list can be empty;

a bandwidth for each of the at least one slice;

a latency for each of the at least one slice;

TBD (To Be Defined).

The computation unit 1003 of the control node 1000 may be configured to compute, according to the slice profile, a result of logical topology for each slice on a physical topology composed by controlled nodes under control of the control node.

The generation unit 1005 of the control node 1000 may be configured to generate splitting information for indicating a controlled node to split a physical port into at least one logical port for each slice and constraints of the at least one logical port for each slice, based on the computed result of logical topology for each slice. As should be understood, not all of the physical ports need to be split into the logical ports. For example, a physical port which does not carry slice information will not be split into the logical ports. That is, the physical port that carries slice information is indicated to be split into the at least one logical port.

Each slice contains the at least one logical port for the slice in the controlled node. The constraints refer to the bandwidth and/or the latency etc. for each slice.

The transceiver 1007 of the control node 1000 may be configured to transmit the computed result, the splitting information and the constraints for each slice as described above to the controlled node.

In an exemplary embodiment, the parsing unit 1001, the computation unit 1003, the generation unit 1005 may be embodied as the Resource Manager 512 in FIG. 5 or the Resource Manager 812 in FIG. 8 as previously described.

Figure 11:
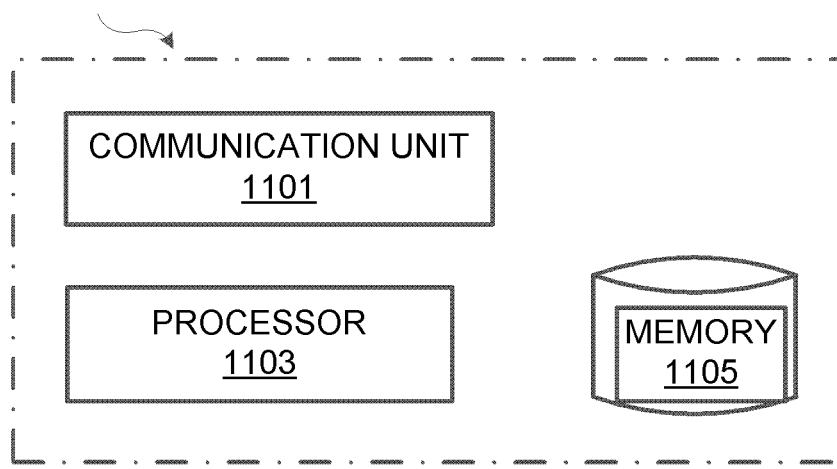
FIG. 11 illustratively shows a schematic structure diagram of a control node according to another exemplary embodiment of the present disclosure.

Hereinafter, another structure of a control node will be described with reference to FIG. 11. FIG. 11 illustratively shows a schematic structure diagram of a control node 1100 according to another exemplary embodiment of the present disclosure. The control node 1100 in FIG. 11 may perform the method 200 described previously with reference to FIG. 2.

As shown in FIG. 11, the control node 1100 comprises at least one controller or processor 1103 comprising e.g., any suitable Central Processing Unit, CPU, microcontroller, Digital Signal Processor, DSP, etc., capable of executing computer program instructions. The computer program instructions may be stored in a memory 1105. The memory 1105 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The example control node 1100 further comprises a communication interface 1101 arranged for communication with a controlled node, such as a PE node or a P node.

The instructions, when loaded from the memory 1105 and executed by the at least one processor 1103, may cause the control node 1100 to perform the method 200 as previously described.

In particular, the instructions, when loaded from the memory 1105 and executed by the at least one processor 1103, may cause the control node 1100 to parse, in step S201, a slice profile which defines slice requirements of at least one slice.

The slice profile may be predetermined or received from a source external to the control node, and may contain at least one of:

a slice list, or a number of the at least one slice;

a slice definition, which includes a prefix list and/or a MAC (Media Access Control) list, wherein the prefix list and/or the MAC list can be empty;

a bandwidth for each of the at least one slice;

a latency for each of the at least one slice;

TBD (To Be Defined).

The instructions, when loaded from the memory 1105 and executed by the at least one processor 1103, may cause the control node 1100 to compute, according to the slice profile, a result of logical topology for each slice on a physical topology composed by controlled nodes under control of the control node as described in step S203.

The instructions, when loaded from the memory 1105 and executed by the at least one processor 1103, may cause the control node 1100 to generate, in step S205, splitting information for indicating a controlled node to split a physical port into at least one logical port for each slice and constraints of the at least one logical port for each slice, based on the computed result of logical topology for each slice. As should be understood, not all of the physical ports need to be split into the logical ports. For example, a physical port which does not carry slice information will not be split into the logical ports. That is, the physical port that carries slice information is indicated to be split into the at least one logical port.

Each slice contains the at least one logical port for the slice in the controlled node. The constraints refer to the bandwidth and/or the latency etc. for each slice.

The instructions, when loaded from the memory 1105 and executed by the at least one processor 1103, may cause the control node 1100 to transmit, in step S207, the computed result, the splitting information and the constraints for each slice as described above to the controlled node.

Figure 12:
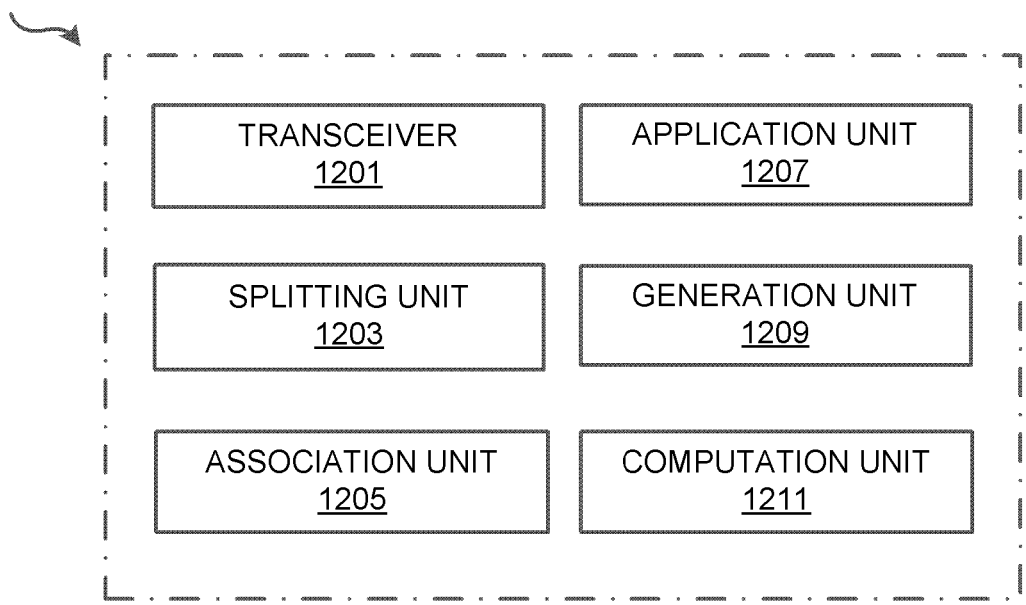
FIG. 12 illustratively shows a schematic structure diagram of a controlled node according to an exemplary embodiment of the present disclosure.

Hereinafter, a structure of a controlled node will be described with reference to FIG. 12. FIG. 12 illustratively shows a schematic structure diagram of a controlled node 1200 according to an exemplary embodiment of the present disclosure. The controlled node 1200 in FIG. 12 may perform the method 300 described previously with reference to FIG. 3.

As shown in FIG. 12, the controlled node 1200 comprises a transceiver 1201, a splitting unit 1203, an association unit 1205, an application unit 1207, a generation unit 1209 and a computation unit 1211. As will be understood by the skilled in the art, common components in the controlled node 1200 are omitted in FIG. 12 for not obscuring the idea of the present disclosure.

The transceiver 1201 may be configured to receive, from a control node, a computed result of logical topology for each slice on a physical topology composed by controlled nodes under control of the control node, and splitting information and constraints for each slice. The computed result is computed according to a slice profile which defines slice requirements of at least one slice, the splitting information and the constraints for each slice are respectively generated based on the computed result, and the splitting information indicates the controlled node to split a physical port into at least one logical port for each slice.

The splitting unit 1203 may be configured to split a physical port into the at least one logical port for a slice based on the received splitting information. As previously discussed, not all of the physical ports need to be split into the logical ports, e.g., a physical port which does not carry slice information is not necessary to be split into the logical ports. That is, the physical port that carries slice information is indicated to be split into the at least one logical port.

Each slice contains the at least one logical port for the slice in the controlled node.

The association unit 1205 may be configured to associate the at least one logical port for the slice with a slice container.

The application unit 1207 may be configured to apply the constraints for the slice on the at least one logical port. The constraints may refer to the bandwidth and/or the latency etc. for the slice.

The generation unit 1209 may be configured to generate a routing table for the slice based on the received computed result and the constraints.

In an embodiment, the controlled node may be configured as a PE node. In this case, the controlled node 1200 may further comprise a resolving unit (not shown). The resolving unit may be configured to resolve, in the at least one tunnel in one slice container, routes of at least one slice traffic included in at least one VPN.

In one implementation of the slice container, the slice container may be configured as one-to-one mapping with IGP instance. In this implementation, the resolving unit may particularly be configured to configure a BGP route policy to filter the prefix list and/or the MAC list in the slice profile, in order to map between the at least one VPN and the at least one slice, which has been described with reference to FIG. 5; and may ignore the BGP route policy when the prefix list and/or the MAC list are empty.

In another implementation of the slice container, it may be configured as a number of IGP instances included in one slice container. In this implementation, the resolving unit may particularly be configured to configure a BGP message with an extension field which indicates mapping between prefixes and the at least one slice based on the slice profile and is included in a last field of the BGP message, in order to map between the at least one VPN and the at least one slice, which has been described with reference to FIG. 8.

In another embodiment, the controlled node may be configured as a P node. The P node, as an intermediate node between two PE nodes, relay slice by interactions with the PE or P node, and thus does not need such a resolving step S310 for the PE node.

The computation unit 1211 may be configured to compute at least one tunnel according to the routing table for the slice based on the slice requirements of the slice.

As such, a tunnel which may fulfill the requirements of the slice may be established for the slice. Accordingly, at least such tunnel may be established for each slice. Then, a slice-specific service assurance, e.g. QoS, can be applied to the specific slice based on the requirements of the specific slice.

In an exemplary embodiment, the splitting unit 1203 and the association unit 1205 may be embodied as the Interface Manager 5211 in FIG. 5 or the Interface Manager 8211 in FIG. 8 as previously described; the generation unit 1209 and the computation unit 1211 may be embodied as the ISIS/OSPF Module 5212/LDP/RSVP/RSVP-TE Module 5212' in FIG. 5 or the ISIS/OSPF Module 8212 in FIG. 8 as previously described.

Figure 13:
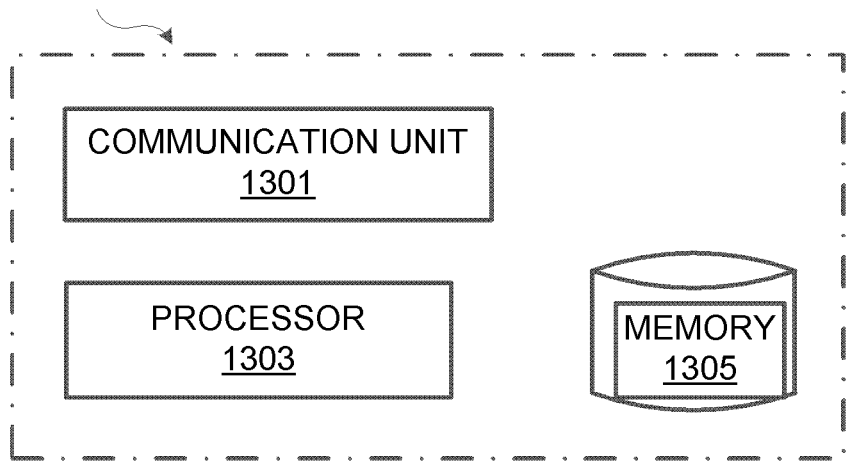
FIG. 13 illustratively shows a schematic structure diagram of a controlled node according to another exemplary embodiment of the present disclosure.

Hereinafter, another structure of a controlled node will be described with reference to FIG. 13. FIG. 13 illustratively shows a schematic structure diagram of a controlled node 1300 according to another exemplary embodiment of the present disclosure. The control node 1300 in FIG. 13 may perform the method 300 described previously with reference to FIG. 3.

As shown in FIG. 13, the controlled node 1300 comprises at least one controller or processor 1303 comprising e.g., any suitable Central Processing Unit, CPU, microcontroller, Digital Signal Processor, DSP, etc., capable of executing computer program instructions. The computer program instructions may be stored in a memory 1305. The memory 1305 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The example controlled node 1300 further comprises a communication interface 1301 arranged for communication with e.g. a controlled node, and/or another controlled node.

The instructions, when loaded from the memory 1305 and executed by the at least one processor 1303, may cause the controlled node 1300 to perform the method 300 as previously described.

In particular, the instructions, when loaded from the memory 1305 and executed by the at least one processor 1303, may cause the controlled node 1300 to receive, in step S301, from a control node, a computed result of logical topology for each slice on a physical topology composed by controlled nodes under control of the control node, and splitting information and constraints for each slice.

As known from the above description related to the control node, the computed result may be computed by the control node according to a slice profile which defines slice requirements of at least one slice.

The slice profile may be predetermined or received from a source external to the control node, and may contain at least one of:
 a slice list, or a number of the at least one slice;
 a slice definition, which includes a prefix list and/or a MAC (Media Access Control) list, wherein the prefix list and/or the MAC list can be empty;
 a bandwidth for each of the at least one slice;
 a latency for each of the at least one slice;
 TBD (To Be Defined).

The splitting information and the constraints for each slice may be respectively generated by the control node based on the computed result. The splitting information generated by the control node may indicate the controlled node to split a physical port into at least one logical port.

The instructions, when loaded from the memory 1305 and executed by the at least one processor 1303, may also cause the controlled node 1300 to split, in step S303, a physical port into at least one logical port for a slice based on the received splitting information. As previously discussed, not all of the physical ports need to be split into the logical ports, e.g., a physical port which does not carry slice information is not necessary to be split into the logical ports. That is, the physical port that carries slice information is indicated to be split into the at least one logical port.

Each slice contains the at least one logical port for the slice in the controlled node.

The instructions, when loaded from the memory 1305 and executed by the at least one processor 1303, may also cause the controlled node 1300 to associate, in step S305, the at least one logical port for the slice with a slice container.

The instructions, when loaded from the memory 1305 and executed by the at least one processor 1303, may also cause the controlled node 1300 to apply, in step S307, the constraints for the slice on the at least one logical port for the slice. The constraints may refer to the bandwidth and/or the latency etc. for the slice.

The instructions, when loaded from the memory 1305 and executed by the at least one processor 1303, may also cause the controlled node 1300 to generate, in step S309, a routing table for the slice based on the received computed result and the constraints.

In an embodiment, the controlled node may be configured as a PE node, and the instructions, when loaded from the memory 1305 and executed by the at least one processor 1303, may further cause the controlled node 1300 to resolve, in the at least one tunnel in one slice container, routes of at least one slice traffic included in at least one VPN in step S310.

In one implementation of the slice container, the slice container may be configured as one-to-one mapping with IGP instance. In this implementation, in step S310, the instructions, when loaded from the memory 1305 and executed by the at least one processor 1303, may cause the controlled node 1300 to resolve may further cause the controlled node 1300 to configure a BGP route policy to filter the prefix list and/or the MAC list in the slice profile, in order to map between the at least one VPN and the at least one slice, which has been described with reference to FIG. 5; and may ignore the BGP route policy when the prefix list and/or the MAC list are empty.

In another implementation of the slice container, it may be configured as a number of IGP instances included in one slice container. In this implementation, in step S310, the instructions, when loaded from the memory 1305 and executed by the at least one processor 1303, may cause the controlled node 1300 to resolve may further cause the controlled node 1300 to configure a BGP message with an extension field which indicates mapping between prefixes and the at least one slice based on the slice profile and is included in a last field of the BGP message, in order to map between the at least one VPN and the at least one slice, which has been described with reference to FIG. 8.

In another embodiment, the controlled node may be configured as a P node. The P node, as an intermediate node between two PE nodes, relay slice by interactions with the PE or P node, and thus does not need such a resolving step S310 for the PE node.

The instructions, when loaded from the memory 1305 and executed by the at least one processor 1303, may also cause the controlled node 1300 to compute, in step S311, at least one tunnel according to the routing table for the slice based on the slice requirements of the slice in the slice container.

As such, a tunnel which may fulfill the requirements of the slice may be established for the slice. Accordingly, at least one such tunnel may be established for each slice. Then, a slice-specific service assurance, e.g. QoS, can be applied to the specific slice based on the requirements of the specific slice.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method in a control node, comprising:
    parsing a slice profile which defines slice requirements of at least one slice;

computing, according to the slice profile, a result of
logical topology for each slice on a physical topology
composed by controlled nodes under control of the
control node;
generating splitting information for indicating a controlled node to split a physical port into at least one
logical port for each slice and constraints of the at least
one logical port for each slice, based on the computed
result; and
transmitting the computed result, the splitting information
and the constraints for each slice to the controlled node,
wherein based at least on the computed result a routine
policy is applied to control routes advertisement
between neighbouring controlled nodes to control a list
of virtual private network 'VPN' routes contained in
each slice.

2. The method according to claim 1, wherein one slice contains the at least one logical port in a controlled node.

3. The method according to claim 1, wherein the physical port that carries slice information is indicated to be split into the at least one logical port.

4. The method according to claim 1, wherein the slice profile contains at least one of:
a number of the at least one slice;
bandwidth for each of the at least one slice;
latency for each of the at least one slice.

5. The method according to claim 4, wherein the constraints for the slice refer to bandwidth and/or latency for the slice.

6. The method according to claim 4, wherein the slice profile further contains a prefix list and/or a media access control 'MAC' list, wherein the prefix list and/or the MAC list can be empty.

7. The method according to claim 1, wherein the slice profile is predetermined or received from an external source.

8. A control node, comprising:
a communication interface arranged for communication with a controlled node,
at least one processor, and
a memory including instructions which, when executed by the at least one processor, cause the control node to:
parse a slice profile which defines slice requirements of at least one slice;
compute, according to the slice profile, a result of logical topology for each slice on a physical topology composed by controlled nodes;
generate splitting information for indicating a controlled node to split a physical port into at least one logical port for each slice and constraints of the at least one logical port for each slice, based on the computed result; and
transmit, via the communication interface, the computed result, the splitting information and the constraints for each slice to the controlled node,
wherein based at least on the computed result a routing policy is applied to control routes advertisement between neighbouring controlled nodes to control a list of virtual private network 'VPN' routes contained in each slice.

9. The control node according to claim 8, wherein one slice contains the at least one logical port in a controlled node.

10. The control node according to claim 8, wherein the physical port that carries slice information is indicated to be split into the at least one logical port.

11. The control node according to claim 8, wherein the slice profile contains at least one of:
a number of the at least one slice;
bandwidth for each of the at least one slice;
latency for each of the at least one slice.

12. The control node according to claim 11, wherein the constraints refer to bandwidth and/or latency for each of the at least one slice.

13. The control node according to claim 11, wherein the slice profile further contains a prefix list and/or a media access control 'MAC' list, wherein the prefix list and/or the MAC list can be empty.

14. The control node according to claim 8, wherein the slice profile is predetermined or received from an external source.

15. A method in a controlled node, comprising:
receiving, from a control node, a computed result of logical topology for each slice on a physical topology composed by controlled nodes under control of the control node, and splitting information and constraints for each slice, wherein the computed result is computed according to a slice profile which defines slice requirements of at least one slice, the splitting information and the constraints for each slice are respectively generated based on the computed result, and the splitting information indicates the controlled node to split a physical port into at least one logical port for each slice;
splitting a physical port into at least one logical port for a slice based on the received splitting information;
associating the at least one logical port for the slice with a slice container;
applying the constraints for the slice on the at least one logical port;
generating a routing table for the slice based on the received computing result and the constraints; and
computing at least one tunnel according to the routing table for the slice based on the slice requirements of the slice,
wherein based at least on the computed result a routing policy is applied to control routes advertisement between neighbouring controlled nodes to control a list of virtual private network 'VPN' routes contained in each slice.

16. A controlled node, comprising:
a communication interface arranged for communication,
at least one processor, and
a memory including instructions which, when executed by the at least one processor, cause the control node to:
receive, from a control node, a computed result of logical topology for each slice on a physical topology composed by controlled nodes under control of the control node, and splitting information and constraints for each slice, wherein the computed result is computed according to a slice profile which defines slice requirements of at least one slice, the splitting information and the constraints for each slice are respectively generated based on the computed result, and the splitting information indicates the controlled node to split a physical port into at least one logical port for each slice;
split a physical port into the at least one logical port for a slice based on the received splitting information;
associate the at least one logical port for the slice with a slice container;
apply the constraints for the slice on the at least one logical port;
generate a routing table for the slice based on the received computed result and the constraints; and
compute at least one tunnel according to the routing table for the slice based on the slice requirements of the slice,
wherein based at least on the computed result a routine policy is applied to control routes advertisement between neighbouring controlled nodes to control a list of virtual private network 'VPN' routes contained in each slice.

17. The controlled node according to claim 16, wherein the slice container at least comprises information on the at least one logical port and the at least one slice.

18. The controlled node according to claim 16, wherein one slice contains the at least one logical port in the controlled node.

19. The controlled node according to claim 16, wherein the physical port being split into the at least one logical port carries slice information.

20. The controlled node according to claim 16, wherein the slice profile contains at least one of:
a number of the at least one slice;
bandwidth for each of the at least one slice;
latency for each of the at least one slice.

21. The controlled node according to claim 20, wherein the constraints for the slice refer to bandwidth and/or latency for the slice.

22. The controlled node according to claim 21, wherein the slice profile further contains a prefix list and/or a media access control 'MAC' list, wherein the prefix list and/or the MAC list can be empty.

23. The controlled node according to claim 16, wherein the controlled node is configured as an intermediate node.

24. The controlled node according to claim 16, wherein the controlled node is configured as an edge node, and the instructions which, when executed by the at least one processor, further cause the control node to:
resolve, in the at least one tunnel in one slice container, routes of at least one slice traffic included in at least one virtual private network 'VPN'.

25. The controlled node according to claim 24, wherein the slice container is configured as one-to-one mapping with an Interior Gateway Protocol 'IGP' instance, and the instructions which, when executed by the at least one processor, cause the control node to resolve, in the at least one tunnel in one slice container, the routes of the at least one slice traffic included in at least one VPN further cause the control node to:
configure a boarder gateway protocol 'BGP' route policy to filter the prefix list and/or the MAC list, in order to map between the at least one VPN and the at least one slice; and
ignore the 'BGP' route policy when the prefix list and/or the MAC list are empty.

26. The controlled node according to claim 24, wherein the slice container is configured as a plurality of Interior Gateway Protocol 'IGP' containers included in one slice instance, and the instructions which, when executed by the at least one processor, cause the control node to resolve, in the at least one tunnel in one slice container, the routes of the at least one slice traffic included in at least one VPN further cause the control node to:
configure a boarder gateway protocol 'BGP' message with an extension field which indicates mapping between prefixes and the at least one slice based on the slice profile and is included in a last field of the BGP message, in order to map between the at least one VPN and the at least one slice.

27. A computer readable non-transitory storage medium storing a computer program which, when executed on at least one processor, cause the at least one processor to perform the method according to claim 1.

28. A computer readable non-transitory storage medium storing a computer program which, when executed on at least one processor, cause the at least one processor to perform the method according to claim 15.

* * * * *